(12) United States Patent
Sharad et al.

(10) Patent No.: US 12,519,822 B1
(45) Date of Patent: Jan. 6, 2026

(54) DOMAIN NAME SYSTEM DATA EXFILTRATION DETECTION USING MACHINE LEARNING TECHNIQUES

(71) Applicant: Splunk Inc., San Francisco, CA (US)

(72) Inventors: Kumar Sharad, Dresden (DE); Namratha Sreekanta, Fremont, CA (US); Abhinav Mishra, San Francisco, CA (US); Glory Emmanuel Avina, Brentwood, CA (US)

(73) Assignee: Cisco Technology, Inc., San Jose, CA (US)

( * ) Notice: Subject to any disclaimer, the term of this patent is extended or adjusted under 35 U.S.C. 154(b) by 85 days.

(21) Appl. No.: 18/646,624

(22) Filed: Apr. 25, 2024

Related U.S. Application Data

(60) Provisional application No. 63/461,853, filed on Apr. 25, 2023.

(51) Int. Cl.
 *H04L 9/40* (2022.01)
(52) U.S. Cl.
 CPC .............................. *H04L 63/1441* (2013.01)
(58) Field of Classification Search
 CPC ............ H04L 63/1441; H04L 61/4511; H04L 63/1416; H04L 63/1425; H04L 63/0236; H04L 63/1466; H04L 63/0245; H04L 63/1408; H04L 63/10; G06N 20/00; G06N 3/02; H04W 12/086
 See application file for complete search history.

(56) References Cited

U.S. PATENT DOCUMENTS

| | | | |
|---|---|---|---|
| 7,937,344 B2 | 5/2011 | Baum et al. | |
| 8,112,425 B2 | 2/2012 | Baum et al. | |
| 8,751,529 B2 | 6/2014 | Zhang et al. | |
| 8,788,525 B2 | 7/2014 | Neels et al. | |
| 9,215,240 B2 | 12/2015 | Merza et al. | |
| 9,286,413 B1 | 3/2016 | Coates et al. | |
| 10,127,258 B2 | 11/2018 | Lamas et al. | |
| 2016/0065611 A1* | 3/2016 | Fakeri-Tabrizi | .... H04L 63/1441 726/23 |
| 2018/0063162 A1* | 3/2018 | Baughman | .......... H04L 63/1416 |
| 2019/0098106 A1 | 3/2019 | Mungel et al. | |
| 2020/0267182 A1* | 8/2020 | Highnam | ............ H04L 63/0236 |

(Continued)

OTHER PUBLICATIONS

Splunk Enterprise 8.0.0 Overview, available online, retrieved May 20, 2020 from docs.splunk.com.

(Continued)

*Primary Examiner* — Ali S Abyaneh
(74) *Attorney, Agent, or Firm* — Rutan & Tucker, LLP; Kyle M. St. James

(57) ABSTRACT

Methods and devices are disclosed herein to facilitate the detection of Domain Name System (DNS) exfiltration attacks. In some examples, a DNS request is used to generate a tokenized vector that corresponds to the DNS request, features of the DNS request, and aggregated features calculated over a sliding window representative of a recent history of events between a particular source and domain. The tokenized vector is input into a neural network to generate a probability score indicating a likelihood that the current DNS request corresponds to a DNS exfiltration. A graphical user interface is generated to display an indication of the probability score for the current DNS request.

20 Claims, 9 Drawing Sheets

(56) References Cited

U.S. PATENT DOCUMENTS

2021/0400061 A1* 12/2021 Antoniewicz ....... H04L 61/4511
2022/0294757 A1* 9/2022 Khasanova ......... H04L 61/4511

OTHER PUBLICATIONS

Splunk Cloud 8.0.2004 User Manual, available online, retrieved May 20, 2020 from docs.splunk.com.
Splunk Quick Reference Guide, updated 2019, available online at https://www.splunk.com/pdfs/solution-guides/splunk-quick-reference-guide.pdf, retrieved May 20, 2020.
Carraso, David, "Exploring Splunk," published by Cito Research, New York, NY, Apr. 2012.
Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

* cited by examiner

DOMAIN NAME SYSTEM DATA EXFILTRATION DETECTION USING MACHINE LEARNING TECHNIQUES

RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

Domain Name System (DNS) is a hierarchical, distributed database that maps domain names to Internet Protocol (IP) addresses. Additionally, tunneling is a communication protocol that securely transmits encapsulated data packets between networks. The DNS protocol is a protocol that enables human users to intuitively navigate the internet and is foundational and crucial for network communication. Thus, DNS protocol communications are allowed to move through firewalls without much scrutiny. As a result, malicious actors have successfully been able to exploit this integral aspect of network communication having minimal oversight to create DNS tunneling that allows data transfer between networks, which is beyond the original intention of DNS protocol.

BRIEF DESCRIPTION OF THE DRAWINGS

Illustrative examples are described in detail below with reference to the following figures.

DETAILED DESCRIPTION

Figure 1:
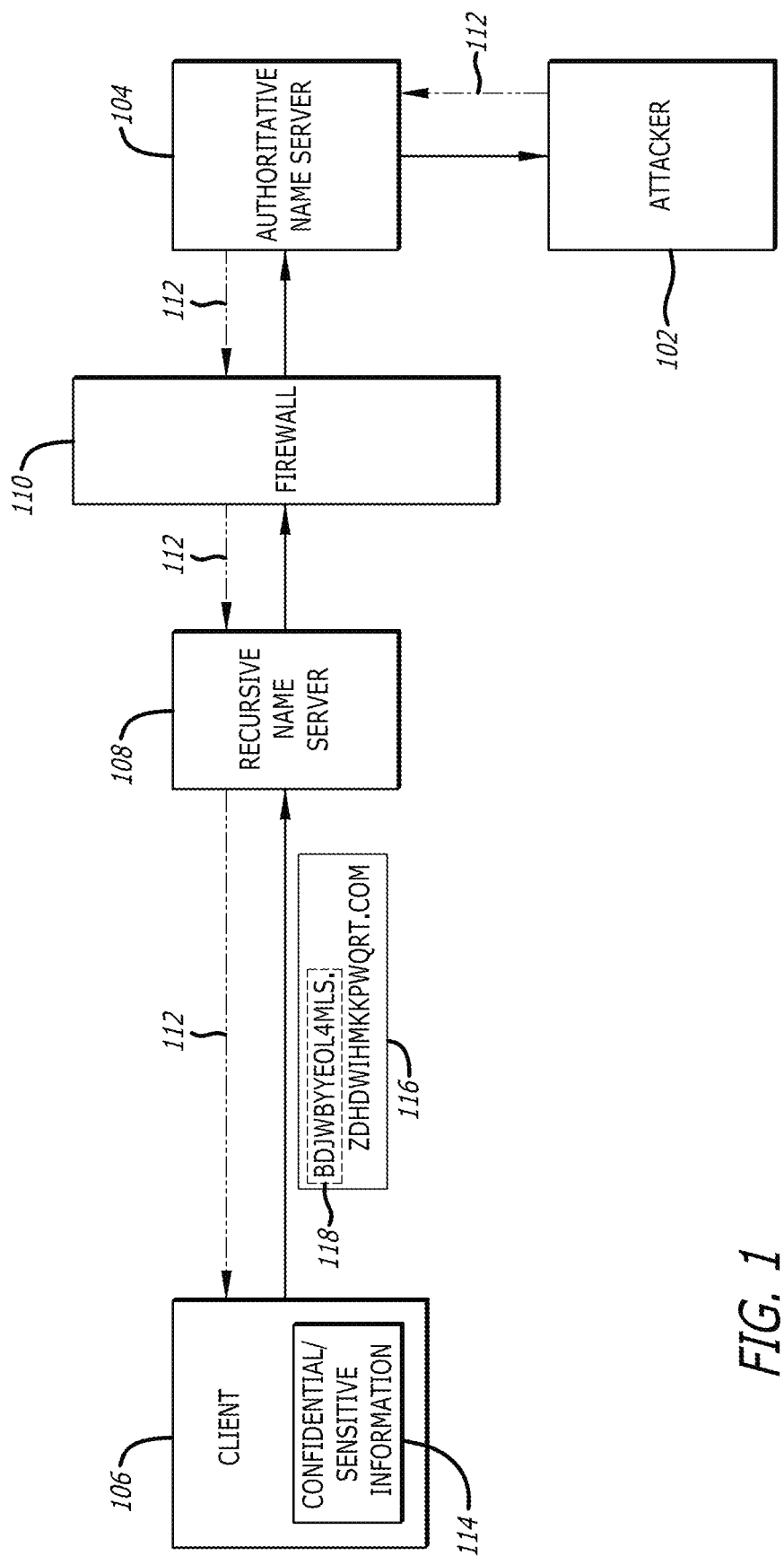
FIG. 1 is a block diagram of an example of a DNS data exfiltration scenario according to an implementation of the disclosure.

As mentioned above, Domain Name System (DNS) is a hierarchical, distributed database that maps domain names to Internet Protocol (IP) addresses and tunneling is a communication protocol that securely transmits encapsulated data packets between networks.

As also noted above, DNS protocol communications typically navigate through firewalls without much scrutiny from malware or threat detection systems, which have led to malicious actors utilizing these communications to carry out malicious activity such as exfiltration of confidential information, which is commonly referred to as DNS exfiltration.

DNS protocol is a protocol that enables human users to intuitively navigate the internet and is foundational and crucial for network communication. Thus, DNS protocol communications are allowed to move through firewalls without much scrutiny. As an example, the User Datagram Protocol (UDP) nature of DNS requests can be exploited by adversaries using either high throughput DNS tunneling techniques or low throughput data exfiltration techniques. The following discussion will focus on combating the low throughput data exfiltration techniques.

In some examples, data exfiltration can be carried out by an outside attacker, where the attacker utilizes sophisticated techniques like phishing to inject malware into a target system. In other examples, data exfiltration can be perpetrated by an insider, where a company employee initiates the transfer of sensitive data outside of the company's secure network. In either example, once injected into the target system, the malware orchestrates periodic data exfiltration, e.g., DNS exfiltration.

For example, in low throughput data exfiltration, malware may encode sensitive or confidential information (e.g., Personal Identifiable Information (PII), user credentials, or other confidential data) and include the encoded sensitive information as subdomain texts in DNS requests to a domain controlled by the attacker. If the sensitive data is too large to fit into a single DNS query, the malware may break down the data into query-sized chunks, where each chunk is encoded and disguised as a DNS request. Since the attacker is aware of the exfiltration strategy implemented by the malware, the attacker can easily decode a single query or decode and combine multiple queries from the same host to reconstruct the data.

While machine learning techniques have long been utilized in detecting malware, utilization of machine learning techniques for detection of DNS exfiltration is relatively new. In particular, as much of DNS requests are encoded, detection of DNS exfiltration of sensitive data has proven difficult. For example, deep learning models such as neural networks are configured to receive as input a consistently sized input vector. While many DNS requests are 255 characters, such is not guaranteed and many vary greatly. Padding or trimming a DNS request to meet a particular length for processing by a neural network alters the DNS request and results in inaccurate predictions.

In embodiments of the disclosure, DNS requests are analyzed as being associated with DNS exfiltration by tokenizing the DNS request into a first vector, where each element of the first vector corresponds to one of a set of printable characters. Thus, the first vector accurately captures the entirety of the DNS request and avoids trimming or padding to achieve a particular length. Additionally, a second vector may be formed by determining a set of additional features such as (1) the length of the current DNS request, (2) entropy of the current DNS request, (3) average value of entropy over the number of DNS requests, and (4) average length of DNS requests over the number of DNS requests. The first and second vectors may then be concatenated into a single input vector, that is provided as input to a neural network trained to determine a probability score indicating the likelihood that the DNS request is associated with DNS exfiltration. The deep learning models described herein perform very well and have a very low misfire rate, ensuring almost all benign DNS requests are classified correctly. In some examples, the risk of DNS exfiltration is lower than 0.1%, and the False Positive Rate is only 0.01%.

Referring now to FIG. 1, a block diagram of an example of a DNS data exfiltration scenario is shown according to some implementations. Initially, an attacker 102 registers a malicious domain (e.g., "ZDHDWIHMKKPWQRT.com") and sets up an Authoritative Name Server 104 with "NS.ZDHDWIHMKKPWQRT.com," which is under control of the attacker 102. Next, the attacker 102 will infect a client 106 (e.g., device), which is part of or connected to a target system, with malware 112.

The malware 112 is designed to obtain sensitive information from the target system. Once the malware obtains the sensitive information 114, the malware encodes the sensitive information 114, such as a user password "Password," as "BDJWBYYEOL4MLS" (encoded information 118). The malware 112 then generates a DNS request 116 to a registered domain controlled by the attacker 102 by encapsulating the encoded information 118 in the subdomain text. In the example shown in FIG. 1, the sample DNS request 116 is illustrated as "BDJWBYYEOL4MLS.ZDHDWIHMKKPWQRT.com," where "BDJWBYYEOL4MLS" is the encoded information 118 encapsulated in the subdomain text of the DNS request 116.

The malware-infected client 106 transmits the DNS request 116 to a Recursive Name Server 108, which is operating under the control of the attacker 102. As mentioned above, DNS protocol communications typically move through firewalls without much scrutiny. Thus, upon receipt of the DNS request 116, the Recursive Name Server 108 sends the DNS request 116 through a firewall 110 to the Authoritative Name Server 104 (e.g., "NS.ZDHD-WIHMKKPWQRT.com").

Upon receipt of the DNS request 116, the Authoritative Name Server 104 provides the attacker 102 with the subdomain value, which is the encoded information 118. The attacker 102 decodes the encoded information "BDJWBYYEOL4MLS" 118 to retrieve the sensitive information "Password" 114. If the sensitive information 114 is too large to be transmitted in a single DNS request, the malware can break down the data into query-sized chunks, where each chunk is encoded and disguised as a separate DNS request. The attacker can then decode the separate DNS requests from the same host to reconstruct the sensitive data.

An attacker can easily download exfiltration tools online to generate DNS exfiltration requests. Detection of these requests requires a complex process of lexical analysis, which is difficult given the high volume and frequency of DNS queries. Thus, the examples described herein utilize deep learning to aid in the detection of data exfiltration queries in near real time.

Figure 2:
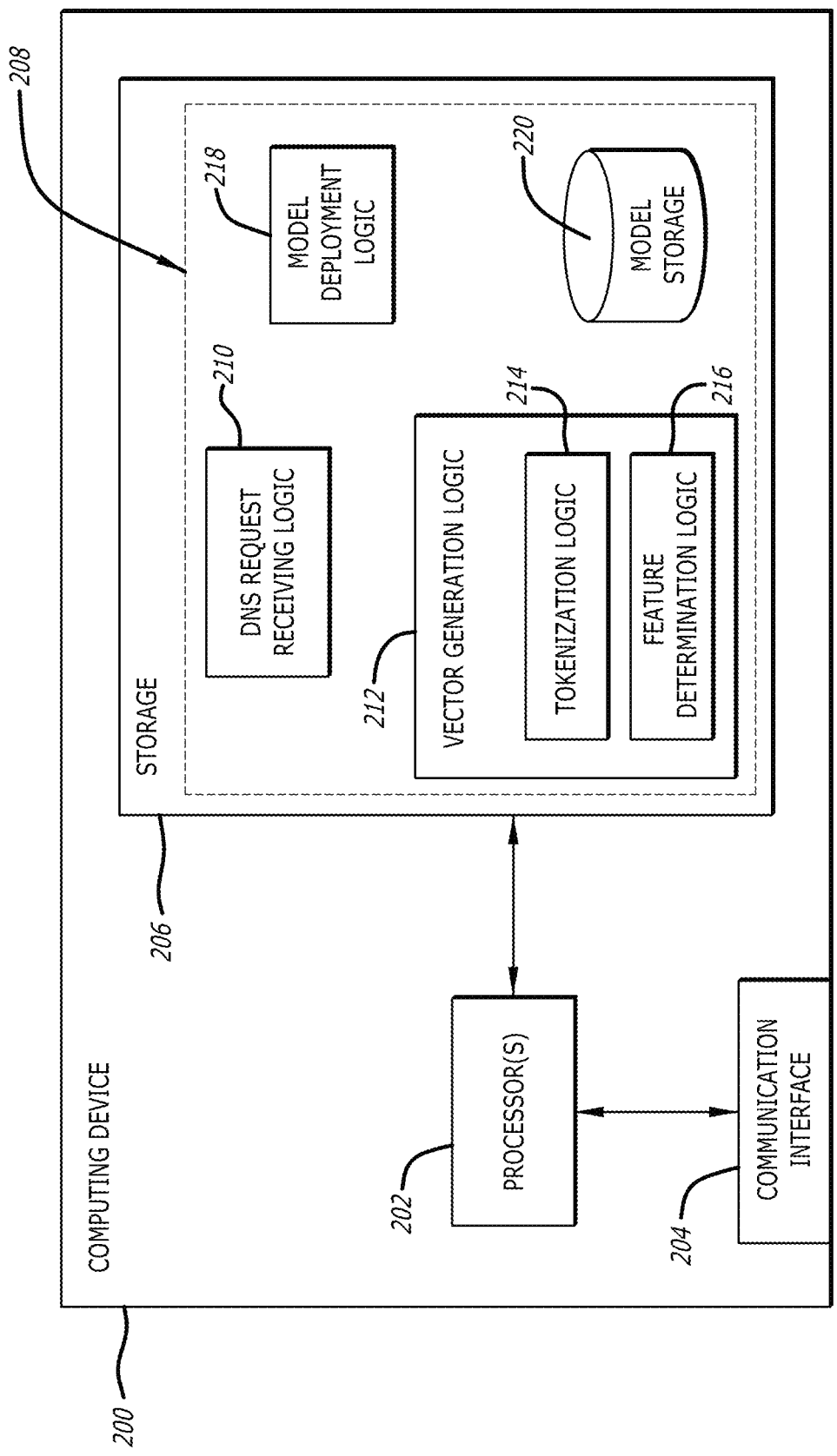
FIG. 2 is a logic diagram of an example of logic stored on a computing device that is configured to perform the methods described herein according to an implementation of the disclosure.

FIG. 2 is a logic diagram of an example of logic stored on a computing device that is configured to perform the methods described herein. In the example shown in FIG. 2, a computing device 200 includes one or more processors 202 that is communicatively coupled to a communication interface 204 and storage 206, which may be non-transitory computer readable medium. The storage 206 may have stored thereon logic, e.g., in the form of computer-executable instructions, that, when executed by the processor 202, cause the processor 202 to perform the methods described herein.

As used herein, one implementation of a computing device may be server device that has a memory for storing program code instructions and a hardware processor for executing the instructions. The server device can further include other physical components, such as a network interface or components for input and output. The storage 206 may include components that collectively may be referred to as a DNS exfiltration detection system 208, which includes a DNS request receiving logic 210, a vector generation logic 212, a model deployment logic 218, and optionally, a model storage 220. The vector generation logic 212 may include sub-logic modules including a tokenization logic 214 and a feature determination logic 216. In some implementations, the storage 206 may include the model storage 220 configured to store trained machine learning models, such as trained neural networks configured to receive an input vector representative of features of a DNS request and, upon analyzing the input vector, generate a probability score indicating the likelihood that the DNS request is associated with DNS exfiltration. In other examples, the model storage 220 may be stored elsewhere and be accessible to the DNS exfiltration detection system 208. Examples of storage 206 include non-transitory computer-readable mediums, such as a magnetic or optical storage disk or a flash or solid-state memory, from which the program code can be loaded into the memory of the computing device 200 for execution. The term "non-transitory" refers to retention of the program code by the computer-readable medium while not under power, while volatile or "transitory" memory or media requires power in order to retain data.

The DNS exfiltration detection system 208 and be configured to analyze a DNS request to determine the likelihood that the DNS request corresponds to a DNS exfiltration. The DNS request receiving logic 210 may receive a DNS request, which may include receiving user input from a user, such as through a graphical user interface, receiving a batch request of DNS records on which to perform the DNS exfiltration analysis discussed herein, and/or retrieve DNS records stored in a non-transitory, computer-readable medium storage.

According to one example of the DNS exfiltration analysis, a first step in determining whether a DNS request is associated with DNS exfiltration is to tokenize the DNS request into a numerical representation. The tokenization procedure may be performed by the tokenization logic 214 of the vector generation logic 212. More specifically, the DNS request is broken down into smaller units called tokens, which can be words, phrases, or individual characters. In some of the examples described herein, the tokens are individual characters. However, other size tokens could be used in other examples. Regardless of the size of the tokens, the tokens can then be used as a vector representation of the DNS request to facilitate analysis of the DNS request. Thus, the goal of tokenization is to find a small representation of text that provides an accurate and re-constructable depiction of the DNS request for processing by a machine learning model.

Some examples described herein include tokenizing the DNS request into a numerical representation by creating a first vector that represents the DNS request. A vector is a list of numbers, and each number in the list may be referred to as an element of the vector. In some examples, each element of the first vector corresponds to one of a plurality of characters included in a listing of printable text characters. For example, the first vector may be comprised of 94 elements, with each element corresponding to one of a set of printable text characters on a QWERTY keyboard (e.g., numbers, lower case letters, upper case letters, punctuation, and special characters), and each element of the first vector may contain a value representing a number of occurrences of one particular character in the current DNS request. Thus, if the character "p" occurred three times in the DNS request, the first vector representing the DNS request would have an element that corresponds to the character "p," and the value contained in that element would be "3." Accordingly, the first vector would have 93 other elements (in addition to the element that corresponds to the character "p"), each element corresponding to a different printable character and containing a value representing the number of occurrences of that particular character in the current DNS request.

As a second step in some examples, a value for one or more additional features of the DNS request may be determined and/or for one or more additional features determined over span of multiple DNS requests including the current DNS request exchanged between a first source and a first domain. Although any number and type of features may be used, some examples utilize values associated with four additional features (e.g., two features of the current DNS request and two features calculated over a number of DNS requests between a first source and a first domain). In some of these examples, the four additional features are (1) the length of the current DNS request, (2) entropy of the current DNS request, (3) average value of entropy over the number of DNS requests, and (4) average length of DNS requests over the number of DNS requests.

The number of DNS requests over which the features are determined may comprise a sliding window representative of a recent history of events between a particular source (e.g., IP address) and a particular domain. The sliding window can have any suitable size. In some examples, the number of DNS requests between the first source and the first domain over which the features are calculated is a predetermined number N, which includes the current DNS request and N−1 previous DNS requests between the first source and the first domain. In some examples, the number of DNS requests between the first source and the first domain over which the features are calculated is ten (10), which includes the current DNS request and nine previous DNS requests between the first source and the first domain.

In some examples, a third step in determining whether the DNS request is associated with DNS exfiltration includes concatenating the first vector and a second vector corresponding to at least one of the additional features described above. The concatenation of the two vectors may be performed by the vector generation logic 212. In the example given above that utilizes four additional features, the second vector comprises four elements corresponding to four additional features. The result of concatenating the second vector to the first vector is in an input vector representing the current DNS request.

The model deployment logic 218, upon execution by the processors 202, may perform operations including retrieval of a trained machine learning model, such as a neural network, and providing the input vector to the machine learning model as input, where the machine learning model is configured to analyze the input vector and generate a probability score indicative of a likelihood that the DNS request is associated with DNS exfiltration (e.g., a DNS request participating in DNS exfiltration, which may include initial messages between an infected host and an infected server, or DNS requests that exfiltrate data, or other DNS communications that provide instructions to the infected client device). The model deployment logic 218 receives a probability score generated by the machine learning model.

Figure 3:
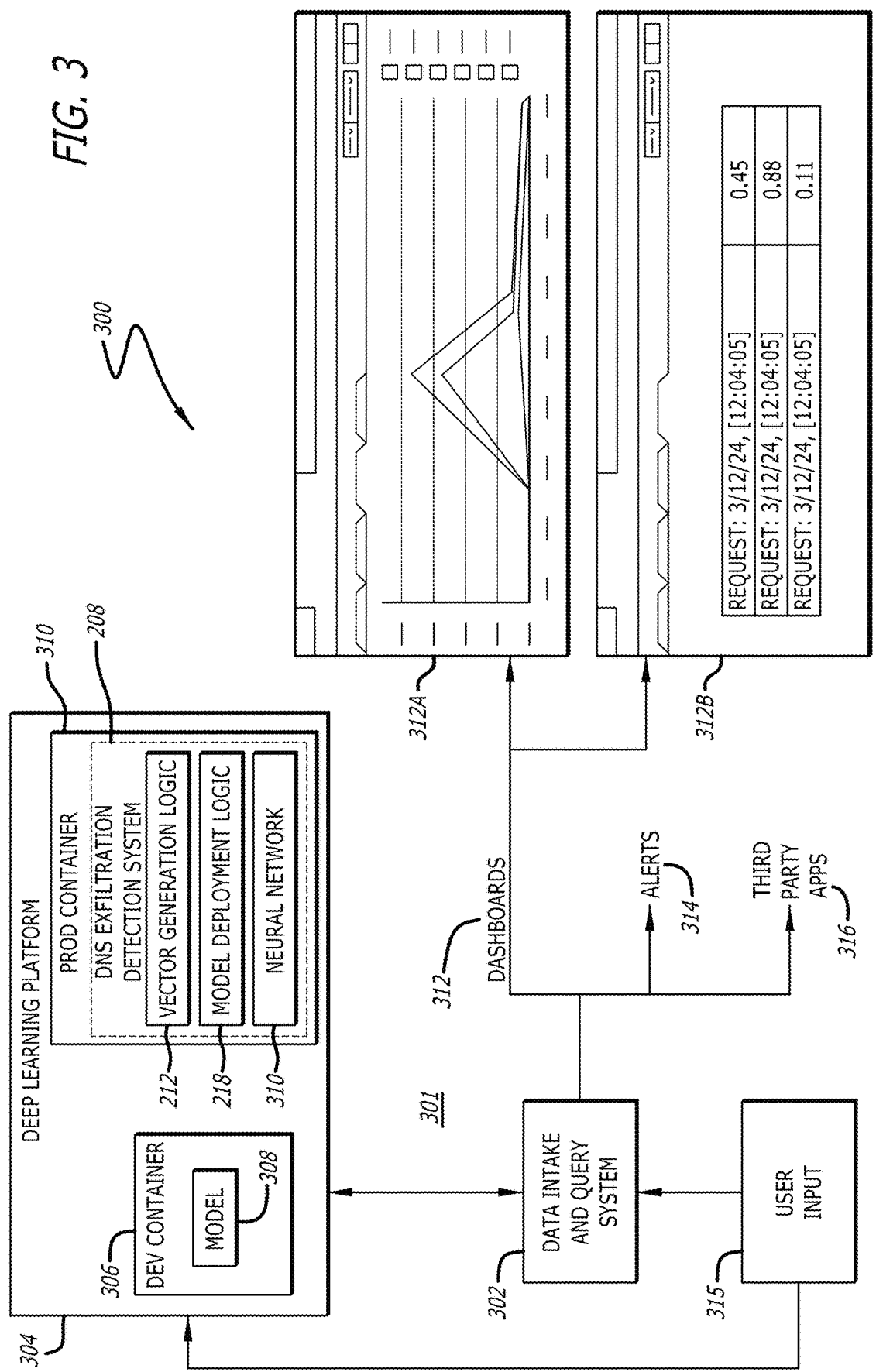
FIG. 3 is a block diagram illustrating a networked environment configured with network components and logic in accordance with example implementations.

Referring now to FIG. 3, a block diagram illustrating a networked environment configured with network components and logic is shown in accordance with example implementations. The logic, upon execution by one or more processors, may be configured to obtain input data (e.g., stored data or user input), analyze the input data with one or more machine learning models such as the neural network illustrated in FIG. 4 below, and provide results and/or one or more dashboards to a data intake and query system instance, which may execute a search query the results of which provide information for at least a first dashboard. The networked environment 300 includes several components including hardware and software that are communicatively coupled through a network, namely the internet, which may be represented by reference number 301. As illustrated, the networked environment 300 includes a data intake and query system 302 communicatively coupled to a deep learning platform 304, which may include multiple containers such as a DEV container 306 and PROD container 310.

The term container may refer to a standalone, executable software package configured to run one or more applications. For example, the DEV container 306 may be a software package configured to run on cloud computing resources and perform machine learning model training. Additionally, the PROD container 310 may be a software package configured to run on cloud computing resources and execute a machine learning model such as a neural network on input data (user input 315) provided by the data intake and query system 302 or otherwise directly from a client device. For example, and as discussed below, the data intake and query system 302 may provide event logs or alerts (or at times, referred to as "notables") corresponding to DNS requests that were flagged as suspicious or malicious. The alerts corresponding to DNS requests are then analyzed by the DNS exfiltration detection system 208 operating within the PROD container 310, which is configured to deploy a trained machine learning model, e.g., a neural network 311, resulting in a prediction whether each DNS request is associated with DNS exfiltration (e.g., a probability score).

As discussed above with respect to at least FIG. 2, the vector generation logic 212 may be configured to, upon execution by one or more processors, first perform a tokenization procedure, which converts the DNS request into a numerical representation such as a vector based on printable character occurrences within the DNS request as discussed above, resulting in a first vector. Second, the vector generation logic 212 may be configured to, upon execution by one or more processors, to determine a set of additional features pertaining to the DNS request, such as the four additional features discussed above: (1) the length of the current DNS request, (2) entropy of the current DNS request, (3) average value of entropy over the number of DNS requests, and (4) average length of DNS requests over the number of DNS requests, resulting in a second vector. Third, the vector generation logic 212 may be configured to, upon execution by one or more processors, to concatenate the first and second vectors resulting in an input vector. The model deployment logic 218 may be configured to, upon execution by one or more processors, provide the input vector as input to a machine learning model, such as the neural network 311.

The analyses performed by either the data intake and query system 302 or the deep learning platform 304 may result in certain actions performed automatically including generation and display of a dashboard 312, generation and display or transmission of alerts 314, and/or generation of instructions for or actions performed automatically using a third-party application 316 (e.g., an email client such as, for example, OUTLOOK® provided by Microsoft Corporation, or other email or messaging client where DNS exfiltration detection system 208 initiates the transmission of information to an end user).

In some implementations, upon receiving a probability score indicating a likelihood that a DNS request is associated with DNS exfiltration, one or more graphical user interfaces (GUIs), e.g., the GUIs 312A-312B, are generated to display DNS exfiltration data (e.g., GUI 312A) and an indication of the probability score for one or more DNS requests that have been analyzed (e.g., GUI 312A). In some examples, the GUI 312A may display data indicative of DNS exfiltration such as a spike or changes in volumes of DNS requests over time. In such an instance, following determination by the neural network 310 that a DNS request is associated with DNS exfiltration (e.g., the probability satisfies a threshold comparison, which may include meeting and/or exceeding a threshold), the data intake and query system 302 may execute a search query, such as a pipelined search query configured to detect changes in volumes of DNS requests either from a particular client device or to a particular domain, where the particular client device or the particular domain was a part of the DNS request determined to be associated with the DNS exfiltration. For example, the visual may enable a security operations center (SOC) analyst to easily detect a client device that has an unusually high number of DNS requests, which may indicate DNS exfiltration. Of course, other dashboards may be provided in accordance with executed search queries such as search queries configured to determine requests by a DNS record type (e.g., A record, AAAA record, CNAME record, etc.), packet size and volume distribution (e.g., determining a series of DNS requests that have significant packet size and high volumes may indicate DNS exfiltration activity), etc.

In some examples, a listing of risk events may be provided that lists a DNS request (or a label corresponding thereto) and the probability score generated by the neural network 310. Additionally, the listing may include a description of each risk event, including an identification of the risk event as a particular type of MITRE ATT&CK (Adversarial Tactics, Techniques, and Common Knowledge), which is a guideline for classifying and describing cyberattacks and intrusions.

Figure 4:
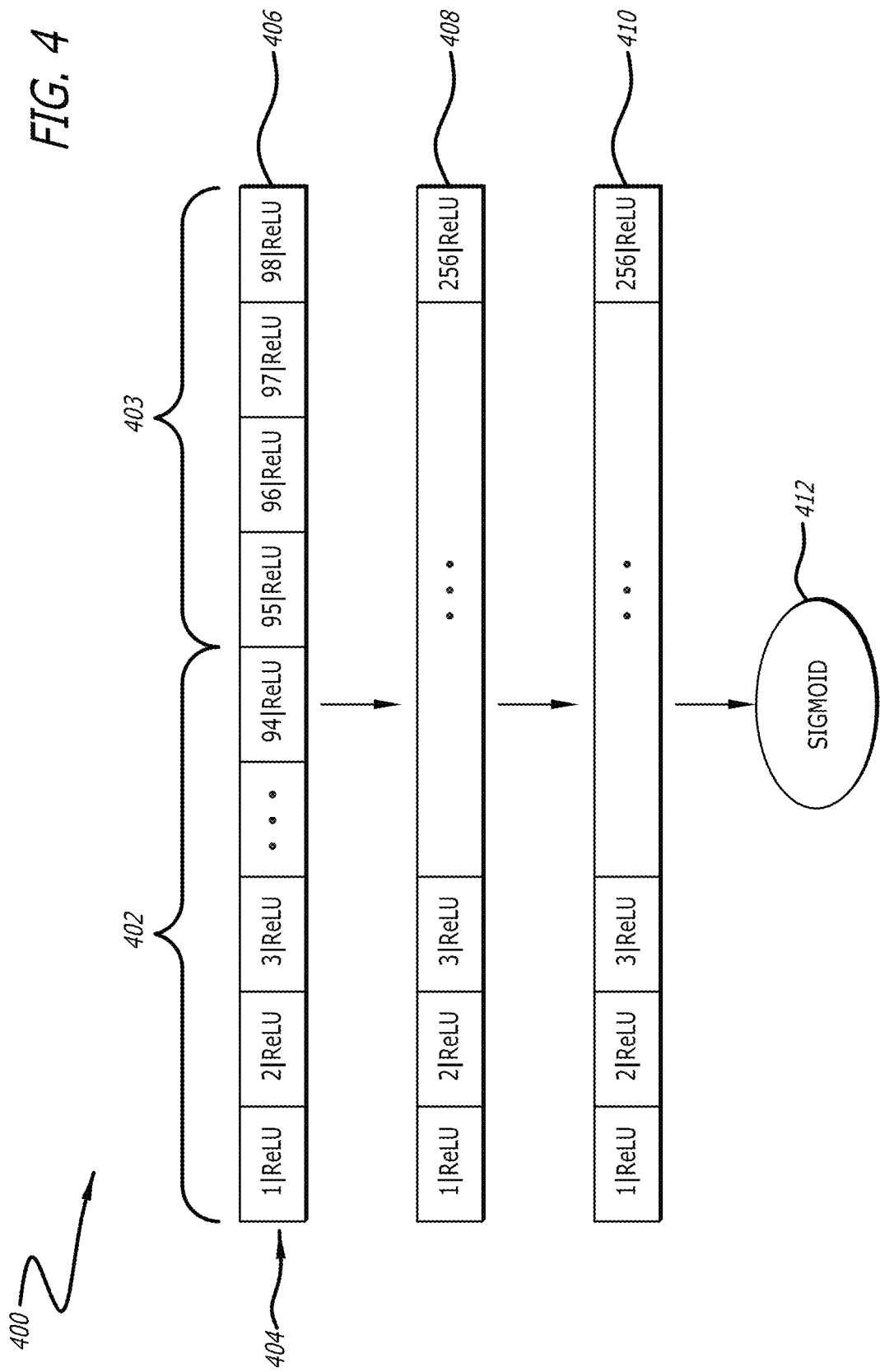
FIG. 4 is an example of a neural network configured to generate a probability score indicating a likelihood that a current DNS request corresponds is associated with DNS exfiltration according to an implementation of the disclosure.

Referring now to FIG. 4, an example of a neural network configured to generate a probability score indicating a likelihood that a current DNS request corresponds is associated with DNS exfiltration is shown in accordance with some implementations. In some examples, the neural network 400 may correspond to a machine learning model deployed by the PROD container 310 such as the neural network 311. The following is a description of how the input vector 404 is generated before the input vector is input into the neural network. An example in which a first vector 402 having 94 elements is concatenated with a second vector 403 having four elements, resulting in an input vector 404 having 98 elements is shown. The input vector 404 is input into an input layer 406 of the neural network 400.

The neural network 400 shown in FIG. 4 contains two dense layers with 256 units each. The dense layers have a rectified linear unit (ReLU) activation function and a drop out of 0.5 to avoid overfitting. The first linear layer 408 is dense (e.g., fully connected) with the input layer 406. The second linear layer 410 is dense (e.g., fully connected) with the first linear layer 408. The output layer 412 is connected to the second linear layer 410 and is a single dense layer with a Sigmoid activation function that converts output into a probability score indicating how likely the input is exfiltration or non-exfiltration.

It should be understood that the architecture provided in FIG. 4 is illustrative of one example. Alternative architectures have been considered and conceived including those with an alternative number of linear layers, an alternative number of units in the input layer and/or the linear layers, and/or an alternative activation function.

Figure 5:
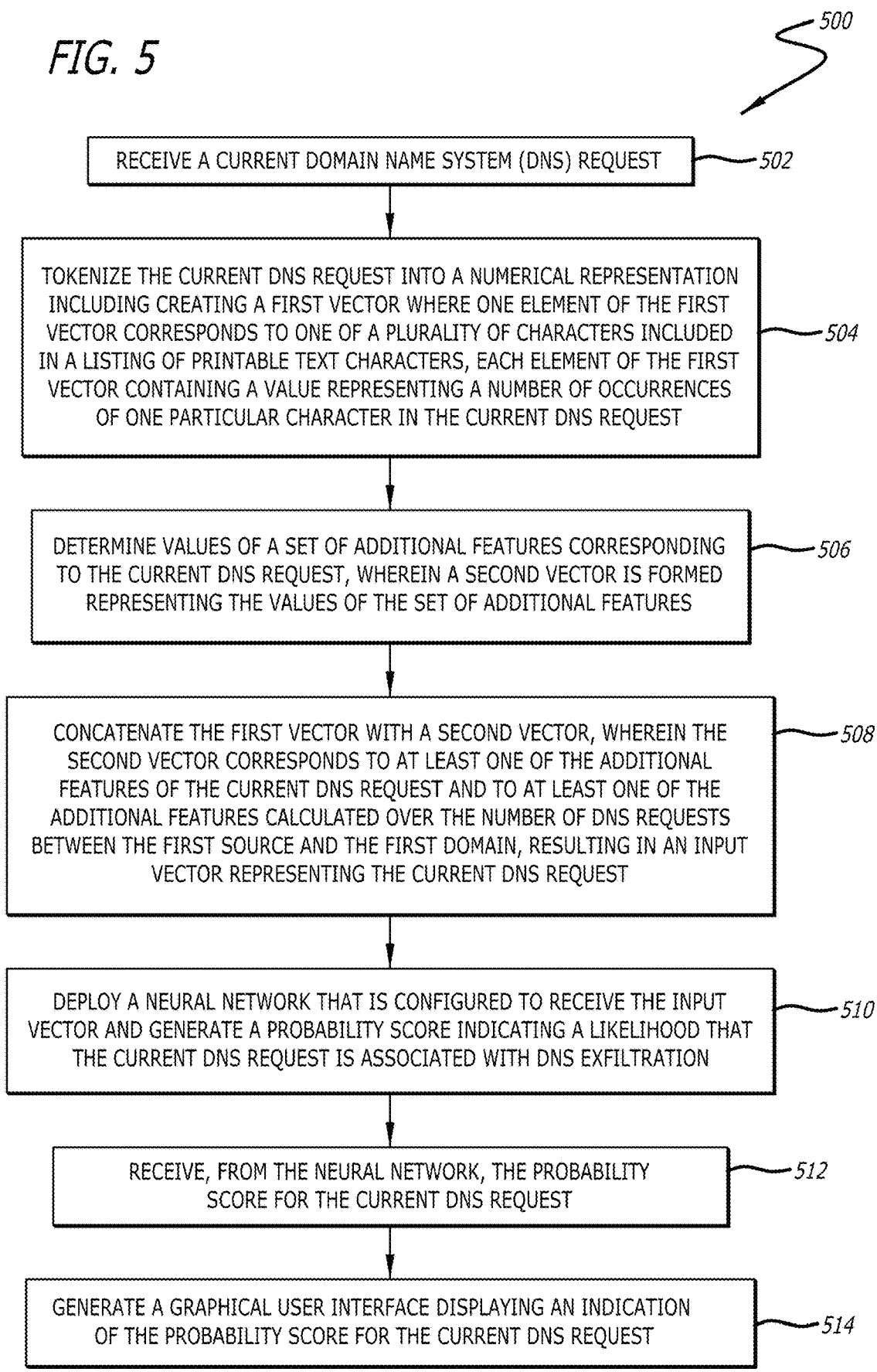
FIG. 5 illustrates flowchart illustrating an example process 500 for generating a probability score indicating a likelihood that a current DNS request corresponds to a DNS exfiltration according to an implementation of the disclosure.

FIG. 5 show a flowchart illustrating an example process 500 for generating a probability score indicating a likelihood that a current DNS request corresponds to a DNS exfiltration. The example process 500 can be implemented, for example, by a computing device that comprises a processor and a non-transitory computer-readable medium. The non-transitory computer readable medium can be storing instructions that, when executed by the processor, can cause the processor to perform the operations of the illustrated process 500. Alternatively or additionally, the process 500 can be implemented using a non-transitory computer-readable medium storing instructions that, when executed by one or more processors, cause the one or more processors to perform the operations of the process 500.

Each block illustrated in FIG. 5 represents an operation in the process 500 performed by, for example, the DNS exfiltration detection system of FIGS. 2-3. It should be understood that not every operation illustrated in FIG. 5 is required. In fact, certain operations may be optional to complete aspects of the process 500. The discussion of the operations of process 500 may be done so with reference to any of the previously described figures. The process 500 begins with an operation of receiving a current Domain Name System (DNS) request (block 502). In some examples, the DNS request may be received by a computing device associated with a system or network of which the client is a part. In other examples, the computing device that receives the DNS request may be a device that is authorized to analyze outgoing DNS requests. In still further examples, the computing device may be the client itself.

The process 500 continues with an operation of tokenizing the current DNS request into a numerical representation by creating a first vector where each element of the first vector corresponds to one of a plurality of characters included in a listing of printable text characters (block 504). In some examples, the first vector comprises 94 elements corresponding to a set of printable text characters. Regardless of the number of elements in the first vector, each element of the first vector contains a value representing a number of occurrences of one particular character in the current DNS request.

Further, values of a set of additional features corresponding to the current DNS request may be determined, where a second vector is formed representing the values of the set of additional features (block 506).

In some examples, determining the values of the set of additional features corresponding to the current DNS request may include: determining a value for one or more additional features of the current DNS request, and/or determining a value for one or more additional features calculated over a number of DNS requests between a first source and a first domain. In some examples, the number of DNS requests over which the features are calculated represents a sliding window representative of a recent history of events between a particular source (e.g., IP address) and a particular domain. The sliding window can have any suitable size. In some examples, the number of DNS requests between the first source and the first domain over which the features are calculated is a predetermined number N (e.g., 10), which includes the current DNS request and N−1 (e.g., 9) previous DNS requests between the first source and the first domain.

Following generation of the first and second vectors, the process 500 may include concatenating the first vector with a second vector, wherein the second vector corresponds to at least one of the additional features of the current DNS request and to at least one of the additional features calculated over the number of DNS requests between the first source and the first domain, resulting in an input vector representing the current DNS request (block 508). In the example given above that utilizes four additional features, the second vector comprises four elements corresponding to four additional features. The result of concatenating the second vector to the first vector is in an input vector representing the current DNS request.

Subsequently, a neural network is deployed that is configured to receive the input vector and generate a probability score indicating a likelihood that the current DNS request is associated with DNS exfiltration (block 510). In some examples, the neural network contains two dense layers with 256 units each. The dense layers have a rectified linear unit (ReLU) activation function and a drop out of 0.5 to avoid overfitting. The first linear layer is dense (e.g., fully connected) with the input layer. The second linear layer is dense (e.g., fully connected) with the first linear layer. The output layer is connected to the second linear layer and is a single dense layer with a Sigmoid activation function that converts output into a probability score indicating how likely the input is exfiltration or non-exfiltration. In other examples, the neural network may have any other suitable number, types, and configuration of layers.

Following deployment of the neural network, a probability score indicating a likelihood that the current DNS request corresponds to a DNS exfiltration is receive from the output layer of the neural network and a graphical user interface providing an indication of the probability score is generated and displayed on a network device (blocks 512, 514). In some examples, the graphical user interface further displays the current DNS request as a risk event when the probability score indicates that the current DNS request corresponds to a DNS exfiltration. In other examples, the graphical user interface may also display a risk score and a listing of risk events. In some examples, one or more of the risk events may indicate that a recent DNS request corresponds to a DNS exfiltration. In further examples, the listing of risk events may further include a description of the risk event, including an identification of the risk event as a particular type of MITRE ATT&CK (Adversarial Tactics, Techniques, and Common Knowledge), which is a guideline for classifying and describing cyberattacks and intrusions. In some examples, the risk score is calculated based on a formula that evaluates overall system risk based on the number and severity of risk events that have occurred over a given period of time.

Entities of various types, such as companies, educational institutions, medical facilities, governmental departments, and private individuals, among other examples, operate computing environments for various purposes. Computing environments, which can also be referred to as information technology environments, can include inter-networked, physical hardware devices, the software executing on the hardware devices, and the users of the hardware and software. As an example, an entity such as a school can operate a Local Area Network (LAN) that includes desktop computers, laptop computers, smart phones, and tablets connected to a physical and wireless network, where users correspond to teachers and students. In this example, the physical devices may be in buildings or a campus that is controlled by the school. As another example, an entity such as a business can operate a Wide Area Network (WAN) that includes physical devices in multiple geographic locations where the offices of the business are located. In this example, the different offices can be inter-networked using a combination of public networks such as the Internet and private networks. As another example, an entity can operate a data center at a centralized location, where computing resources (such as compute, memory, and/or networking resources) are kept and maintained, and whose resources are accessible over a network to users who may be in different geographical locations. In this example, users associated with the entity that operates the data center can access the computing resources in the data center over public and/or private networks that may not be operated and controlled by the same entity. Alternatively or additionally, the operator of the data center may provide the computing resources to users associated with other entities, for example on a subscription basis. Such a data center operator may be referred to as a cloud services provider, and the services provided by such an entity may be described by one or more service models, such as to Software-as-a Service (SaaS) model, Infrastructure-as-a-Service (IaaS) model, or Platform-as-a-Service (PaaS), among others. In these examples, users may expect resources and/or services to be available on demand and without direct active management by the user, a resource delivery model often referred to as cloud computing.

Entities that operate computing environments need information about their computing environments. For example, an entity may need to know the operating status of the various computing resources in the entity's computing environment, so that the entity can administer the environment, including performing configuration and maintenance, performing repairs or replacements, provisioning additional resources, removing unused resources, or addressing issues that may arise during operation of the computing environment, among other examples. As another example, an entity can use information about a computing environment to identify and remediate security issues that may endanger the data, users, and/or equipment in the computing environment. As another example, an entity may be operating a computing environment for some purpose (e.g., to run an online store, to operate a bank, to manage a municipal railway, etc.) and may want information about the computing environment that can aid the entity in understanding whether the computing environment is operating efficiently and for its intended purpose.

Collection and analysis of the data from a computing environment can be performed by a data intake and query system such as is described herein. A data intake and query system can ingest and store data obtained from the components in a computing environment, and can enable an entity to search, analyze, and visualize the data. Through these and other capabilities, the data intake and query system can enable an entity to use the data for administration of the computing environment, to detect security issues, to understand how the computing environment is performing or being used, and/or to perform other analytics.

Figure 6:
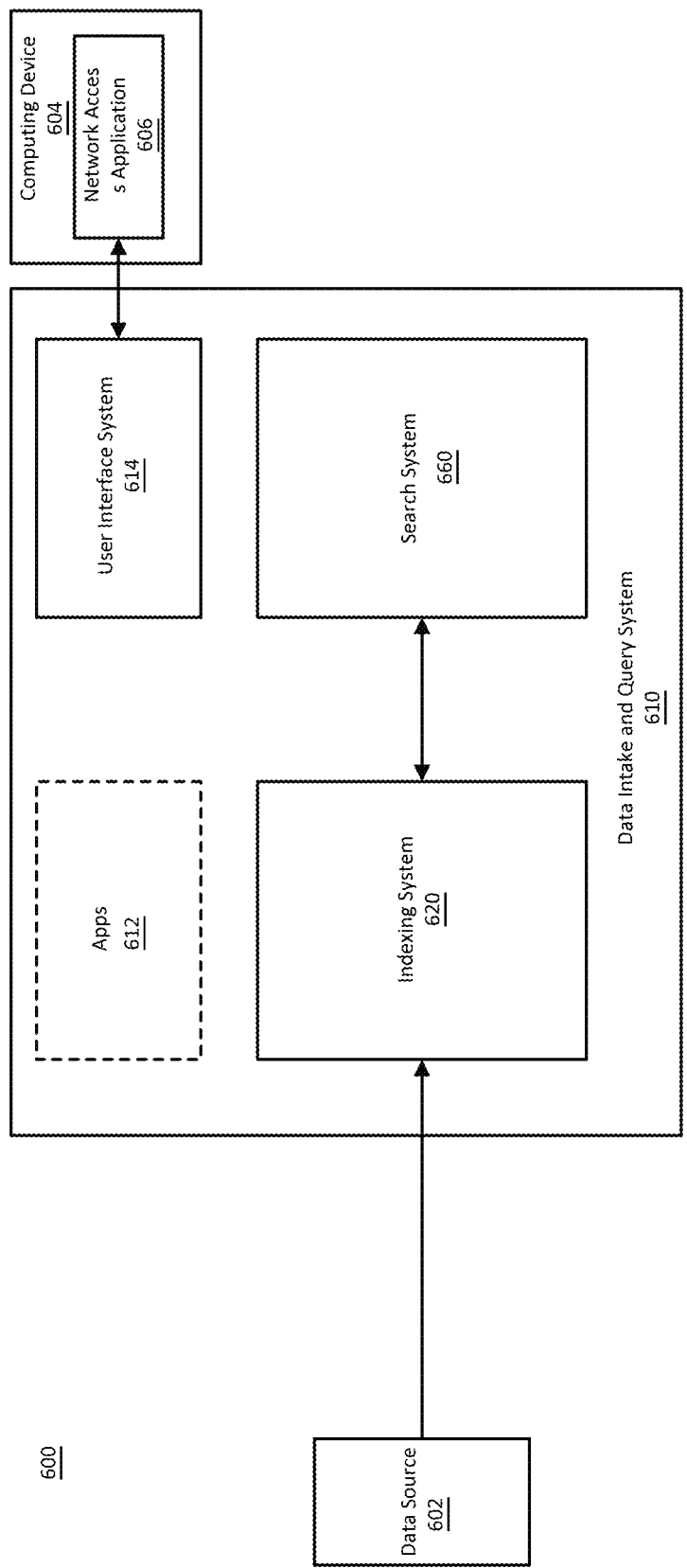
FIG. 6 is a block diagram illustrating an example computing environment that includes a data intake and query system according to an implementation of the disclosure.

FIG. 6 is a block diagram illustrating an example computing environment 600 that includes a data intake and query system 610. The data intake and query system 610 obtains data from a data source 602 in the computing environment 600, and ingests the data using an indexing system 620. A search system 660 of the data intake and query system 610 enables users to navigate the indexed data. Though drawn with separate boxes in FIG. 6, in some implementations the indexing system 620 and the search system 660 can have overlapping components. A computing device 604, running a network access application 606, can communicate with the data intake and query system 610 through a user interface system 614 of the data intake and query system 610. Using the computing device 604, a user can perform various operations with respect to the data intake and query system 610, such as administration of the data intake and query system 610, management and generation of "knowledge objects," (user-defined entities for enriching data, such as saved searches, event types, tags, field extractions, lookups, reports, alerts, data models, workflow actions, and fields), initiating of searches, and generation of reports, among other operations. The data intake and query system 610 can further optionally include apps 612 that extend the search, analytics, and/or visualization capabilities of the data intake and query system 610.

The data intake and query system 610 can be implemented using program code that can be executed using a computing device. A computing device is an electronic device that has a memory for storing program code instructions and a hardware processor for executing the instructions. The computing device can further include other physical components, such as a network interface or components for input and output. The program code for the data intake and query system 610 can be stored on a non-transitory computer-readable medium, such as a magnetic or optical storage disk or a flash or solid-state memory, from which the program code can be loaded into the memory of the computing device for execution. "Non-transitory" means that the computer-readable medium can retain the program code while not under power, as opposed to volatile or "transitory" memory or media that requires power in order to retain data.

In various examples, the program code for the data intake and query system 610 can be executed on a single computing device, or execution of the program code can be distributed over multiple computing devices. For example, the program code can include instructions for both indexing and search components (which may be part of the indexing system 620 and/or the search system 660, respectively), which can be executed on a computing device that also provides the data source 602. As another example, the program code can be executed on one computing device, where execution of the program code provides both indexing and search components, while another copy of the program code executes on a second computing device that provides the data source 602. As another example, the program code can be configured such that, when executed, the program code implements only an indexing component or only a search component. In this example, a first instance of the program code that is executing the indexing component and a second instance of the program code that is executing the search component can be executing on the same computing device or on different computing devices.

The data source 602 of the computing environment 600 is a component of a computing device that produces machine data. The component can be a hardware component (e.g., a microprocessor or a network adapter, among other examples) or a software component (e.g., a part of the operating system or an application, among other examples). The component can be a virtual component, such as a virtual machine, a virtual machine monitor (also referred as a hypervisor), a container, or a container orchestrator, among other examples. Examples of computing devices that can provide the data source 602 include personal computers (e.g., laptops, desktop computers, etc.), handheld devices (e.g., smart phones, tablet computers, etc.), servers (e.g., network servers, compute servers, storage servers, domain name servers, web servers, etc.), network infrastructure devices (e.g., routers, switches, firewalls, etc.), and "Internet of Things" devices (e.g., vehicles, home appliances, factory equipment, etc.), among other examples. Machine data is electronically generated data that is output by the component of the computing device and reflects activity of the component. Such activity can include, for example, operation status, actions performed, performance metrics, communications with other components, or communications with users, among other examples. The component can produce machine data in an automated fashion (e.g., through the ordinary course of being powered on and/or executing) and/or as a result of user interaction with the computing device (e.g., through the user's use of input/output devices or applications). The machine data can be structured, semi-structured, and/or unstructured. The machine data may be referred to as raw machine data when the data is unaltered from the format in which the data was output by the component of the computing device. Examples of machine data include operating system logs, web server logs, live application logs, network feeds, metrics, change monitoring, message queues, and archive files, among other examples.

As discussed in greater detail below, the indexing system 620 obtains machine date from the data source 602 and processes and stores the data. Processing and storing of data may be referred to as "ingestion" of the data. Processing of the data can include parsing the data to identify individual events, where an event is a discrete portion of machine data that can be associated with a timestamp. Processing of the data can further include generating an index of the events, where the index is a data storage structure in which the events are stored. The indexing system 620 does not require prior knowledge of the structure of incoming data (e.g., the indexing system 620 does not need to be provided with a schema describing the data). Additionally, the indexing system 620 retains a copy of the data as it was received by the indexing system 620 such that the original data is always available for searching (e.g., no data is discarded, though, in some examples, the indexing system 620 can be configured to do so).

The search system 660 searches the data stored by the indexing 620 system. As discussed in greater detail below, the search system 660 enables users associated with the computing environment 600 (and possibly also other users) to navigate the data, generate reports, and visualize search results in "dashboards" output using a graphical interface. Using the facilities of the search system 660, users can obtain insights about the data, such as retrieving events from an index, calculating metrics, searching for specific conditions within a rolling time window, identifying patterns in the data, and predicting future trends, among other examples. To achieve greater efficiency, the search system 660 can apply map-reduce methods to parallelize searching of large volumes of data. Additionally, because the original data is available, the search system 660 can apply a schema to the data at search time. This allows different structures to be applied to the same data, or for the structure to be modified if or when the content of the data changes. Application of a schema at search time may be referred to herein as a late-binding schema technique.

The user interface system 614 provides mechanisms through which users associated with the computing environment 600 (and possibly others) can interact with the data intake and query system 610. These interactions can include configuration, administration, and management of the indexing system 620, initiation and/or scheduling of queries that are to be processed by the search system 660, receipt or reporting of search results, and/or visualization of search results. The user interface system 614 can include, for example, facilities to provide a command line interface or a web-based interface.

Users can access the user interface system 614 using a computing device 604 that communicates with data intake and query system 610, possibly over a network. A "user," in the context of the implementations and examples described herein, is a digital entity that is described by a set of information in a computing environment. The set of information can include, for example, a user identifier, a username, a password, a user account, a set of authentication credentials, a token, other data, and/or a combination of the preceding. Using the digital entity that is represented by a user, a person can interact with the computing environment 600. For example, a person can log in as a particular user and, using the user's digital information, can access the data intake and query system 610. A user can be associated with one or more people, meaning that one or more people may be able to use the same user's digital information. For example, an administrative user account may be used by multiple people who have been given access to the administrative user account. Alternatively or additionally, a user can be associated with another digital entity, such as a bot (e.g., a software program that can perform autonomous tasks). A user can also be associated with one or more entities. For example, a company can have associated with it a number of users. In this example, the company may control the users' digital information, including assignment of user identifiers, management of security credentials, control of which persons are associated with which users, and so on.

The computing device 604 can provide a human-machine interface through which a person can have a digital presence in the computing environment 600 in the form of a user. The computing device 604 is an electronic device having one or more processors and a memory capable of storing instructions for execution by the one or more processors. The computing device 604 can further include input/output (I/O) hardware and a network interface. Applications executed by the computing device 604 can include a network access application 606, such as a web browser, which can use a network interface of the client computing device 604 to communicate, over a network, with the user interface system 614 of the data intake and query system 610. The user interface system 614 can use the network access application 606 to generate user interfaces that enable a user to interact with the data intake and query system 610. A web browser is one example of a network access application. A shell tool can also be used as a network access application. In some examples, the data intake and query system 610 is an application executing on the computing device 606. In such examples, the network access application 606 can access the user interface system 614 without going over a network.

The data intake and query system 610 can optionally include apps 612. An app of the data intake and query system 610 is a collection of configurations, knowledge objects (a user-defined entity that enriches the data in the data intake and query system 610), views, and dashboards that may provide additional functionality, different techniques for searching the data, and/or additional insights into the data. The data intake and query system 610 can execute multiple applications simultaneously. Example applications include an information technology service intelligence application, which can monitor and analyze the performance and behavior of the computing environment 600, and an enterprise security application, which can include content and searches to assist security analysts in diagnosing and acting on anomalous or malicious behavior in the computing environment 600.

Though FIG. 6 illustrates only one data source, in practical implementations, the computing environment 600 contains many data sources spread across numerous computing devices. The computing devices may be controlled and operated by a single entity. For example, in an "on the premises" or "on-prem" implementation, the computing devices may physically and digitally be controlled by one entity, meaning that the computing devices are in physical locations that are owned and/or operated by the entity and are within a network domain that is controlled by the entity. In an entirely on-prem implementation of the computing environment 600, the data intake and query system 610 executes on an on-prem computing device and obtains machine data from on-prem data sources. An on-prem implementation can also be referred to as an "enterprise" network, though the term "on-prem" refers primarily to physical locality of a network and who controls that location while the term "enterprise" may be used to refer to the network of a single entity. As such, an enterprise network could include cloud components.

"Cloud" or "in the cloud" refers to a network model in which an entity operates network resources (e.g., processor capacity, network capacity, storage capacity, etc.), located for example in a data center, and makes those resources available to users and/or other entities over a network. A "private cloud" is a cloud implementation where the entity provides the network resources only to its own users. A "public cloud" is a cloud implementation where an entity operates network resources in order to provide them to users that are not associated with the entity and/or to other entities. In this implementation, the provider entity can, for example, allow a subscriber entity to pay for a subscription that enables users associated with subscriber entity to access a certain amount of the provider entity's cloud resources, possibly for a limited time. A subscriber entity of cloud resources can also be referred to as a tenant of the provider entity. Users associated with the subscriber entity access the cloud resources over a network, which may include the public Internet. In contrast to an on-prem implementation, a subscriber entity does not have physical control of the computing devices that are in the cloud, and has digital access to resources provided by the computing devices only to the extent that such access is enabled by the provider entity.

In some implementations, the computing environment 600 can include on-prem and cloud-based computing resources, or only cloud-based resources. For example, an entity may have on-prem computing devices and a private cloud. In this example, the entity operates the data intake and query system 610 and can choose to execute the data intake and query system 610 on an on-prem computing device or in the cloud. In another example, a provider entity operates the data intake and query system 610 in a public cloud and provides the functionality of the data intake and query system 610 as a service, for example under a Software-as-a-Service (SaaS) model, to entities that pay for the user of the service on a subscription basis. In this example, the provider entity can provision a separate tenant (or possibly multiple tenants) in the public cloud network for each subscriber entity, where each tenant executes a separate and distinct instance of the data intake and query system 610. In some implementations, the entity providing the data intake and query system 610 is itself subscribing to the cloud services of a cloud service provider. As an example, a first entity provides computing resources under a public cloud service model, a second entity subscribes to the cloud services of the first provider entity and uses the cloud computing resources to operate the data intake and query system 610, and a third entity can subscribe to the services of the second provider entity in order to use the functionality of the data intake and query system 610. In this example, the data sources are associated with the third entity, users accessing the data intake and query system 610 are associated with the third entity, and the analytics and insights provided by the data intake and query system 610 are for purposes of the third entity's operations.

Figure 7:
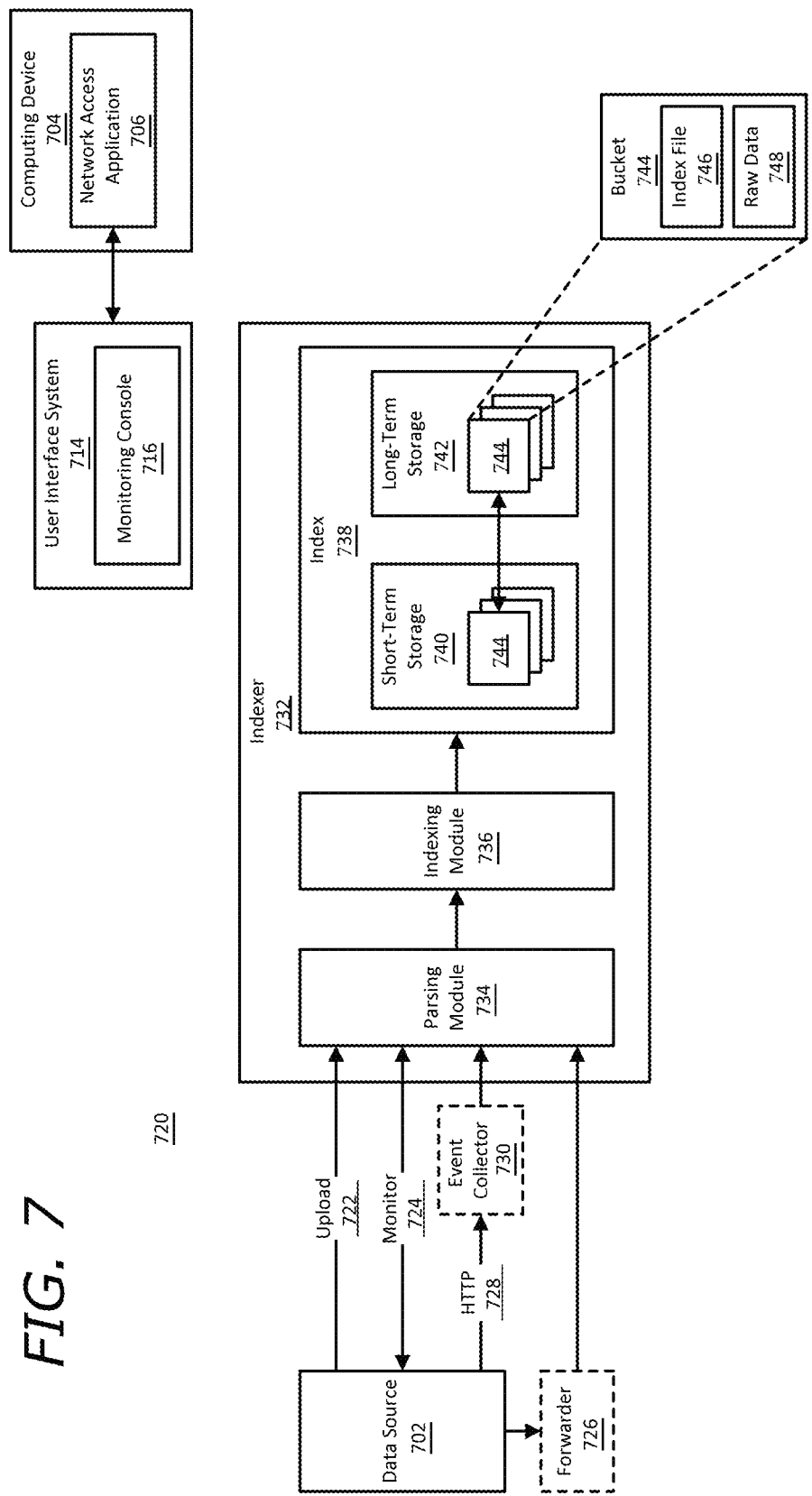
FIG. 7 is a block diagram illustrating in greater detail an example of an indexing system of a data intake and query system, such as the data intake and query system of FIG. 6 according to an implementation of the disclosure.

FIG. 7 is a block diagram illustrating in greater detail an example of an indexing system 720 of a data intake and query system, such as the data intake and query system 610 of FIG. 6. The indexing system 720 of FIG. 7 uses various methods to obtain machine data from a data source 702 and stores the data in an index 738 of an indexer 732. As discussed previously, a data source is a hardware, software, physical, and/or virtual component of a computing device that produces machine data in an automated fashion and/or as a result of user interaction. Examples of data sources include files and directories; network event logs; operating system logs, operational data, and performance monitoring data; metrics; first-in, first-out queues; scripted inputs; and modular inputs, among others. The indexing system 720 enables the data intake and query system to obtain the machine data produced by the data source 702 and to store the data for searching and retrieval.

Users can administer the operations of the indexing system 720 using a computing device 704 that can access the indexing system 720 through a user interface system 714 of the data intake and query system. For example, the computing device 704 can be executing a network access application 706, such as a web browser or a terminal, through which a user can access a monitoring console 716 provided by the user interface system 714. The monitoring console 716 can enable operations such as: identifying the data source 702 for data ingestion; configuring the indexer 732 to index the data from the data source 732; configuring a data ingestion method; configuring, deploying, and managing clusters of indexers; and viewing the topology and performance of a deployment of the data intake and query system, among other operations. The operations performed by the indexing system 720 may be referred to as "index time" operations, which are distinct from "search time" operations that are discussed further below.

The indexer 732, which may be referred to herein as a data indexing component, coordinates and performs most of the index time operations. The indexer 732 can be implemented using program code that can be executed on a computing device. The program code for the indexer 732 can be stored on a non-transitory computer-readable medium (e.g. a magnetic, optical, or solid state storage disk, a flash memory, or another type of non-transitory storage media), and from this medium can be loaded or copied to the memory of the computing device. One or more hardware processors of the computing device can read the program code from the memory and execute the program code in order to implement the operations of the indexer 732. In some implementations, the indexer 732 executes on the computing device 704 through which a user can access the indexing system 720. In some implementations, the indexer 732 executes on a different computing device than the illustrated computing device 704.

The indexer 732 may be executing on the computing device that also provides the data source 702 or may be executing on a different computing device. In implementations wherein the indexer 732 is on the same computing device as the data source 702, the data produced by the data source 702 may be referred to as "local data." In other implementations the data source 702 is a component of a first computing device and the indexer 732 executes on a second computing device that is different from the first computing device. In these implementations, the data produced by the data source 702 may be referred to as "remote data." In some implementations, the first computing device is "on-prem" and in some implementations the first computing device is "in the cloud." In some implementations, the indexer 732 executes on a computing device in the cloud and the operations of the indexer 732 are provided as a service to entities that subscribe to the services provided by the data intake and query system.

For a given data produced by the data source 702, the indexing system 720 can be configured to use one of several methods to ingest the data into the indexer 732. These methods include upload 722, monitor 724, using a forwarder 726, or using HyperText Transfer Protocol (HTTP 728) and an event collector 730. These and other methods for data ingestion may be referred to as "getting data in" (GDI) methods.

Using the upload 722 method, a user can specify a file for uploading into the indexer 732. For example, the monitoring console 716 can include commands or an interface through which the user can specify where the file is located (e.g., on which computing device and/or in which directory of a file system) and the name of the file. The file may be located at the data source 702 or maybe on the computing device where the indexer 732 is executing. Once uploading is initiated, the indexer 732 processes the file, as discussed further below. Uploading is a manual process and occurs when instigated by a user. For automated data ingestion, the other ingestion methods are used.

The monitor 724 method enables the indexing system 702 to monitor the data source 702 and continuously or periodically obtain data produced by the data source 702 for ingestion by the indexer 732. For example, using the monitoring console 716, a user can specify a file or directory for monitoring. In this example, the indexing system 702 can execute a monitoring process that detects whenever the file or directory is modified and causes the file or directory contents to be sent to the indexer 732. As another example, a user can specify a network port for monitoring. In this example, a monitoring process can capture data received at or transmitting from the network port and cause the data to be sent to the indexer 732. In various examples, monitoring can also be configured for data sources such as operating system event logs, performance data generated by an operating system, operating system registries, operating system directory services, and other data sources.

Monitoring is available when the data source 702 is local to the indexer 732 (e.g., the data source 702 is on the computing device where the indexer 732 is executing). Other data ingestion methods, including forwarding and the event collector 730, can be used for either local or remote data sources.

A forwarder 726, which may be referred to herein as a data forwarding component, is a software process that sends data from the data source 702 to the indexer 732. The forwarder 726 can be implemented using program code that can be executed on the computer device that provides the data source 702. A user launches the program code for the forwarder 726 on the computing device that provides the data source 702. The user can further configure the forwarder 726, for example to specify a receiver for the data being forwarded (e.g., one or more indexers, another forwarder, and/or another recipient system), to enable or disable data forwarding, and to specify a file, directory, network events, operating system data, or other data to forward, among other operations.

The forwarder 726 can provide various capabilities. For example, the forwarder 726 can send the data unprocessed or can perform minimal processing on the data before sending the data to the indexer 732. Minimal processing can include, for example, adding metadata tags to the data to identify a source, source type, and/or host, among other information, dividing the data into blocks, and/or applying a timestamp to the data. In some implementations, the forwarder 726 can break the data into individual events (event generation is discussed further below) and send the events to a receiver. Other operations that the forwarder 726 may be configured to perform include buffering data, compressing data, and using secure protocols for sending the data, for example.

Forwarders can be configured in various topologies. For example, multiple forwarders can send data to the same indexer. As another example, a forwarder can be configured to filter and/or route events to specific receivers (e.g., different indexers), and/or discard events. As another example, a forwarder can be configured to send data to another forwarder, or to a receiver that is not an indexer or a forwarder (such as, for example, a log aggregator).

The event collector 730 provides an alternate method for obtaining data from the data source 702. The event collector 730 enables data and application events to be sent to the indexer 732 using HTTP 728. The event collector 730 can be implemented using program code that can be executing on a computing device. The program code may be a component of the data intake and query system or can be a standalone component that can be executed independently of the data intake and query system and operates in cooperation with the data intake and query system.

To use the event collector 730, a user can, for example using the monitoring console 716 or a similar interface provided by the user interface system 714, enable the event collector 730 and configure an authentication token. In this context, an authentication token is a piece of digital data generated by a computing device, such as a server, that contains information to identify a particular entity, such as a user or a computing device, to the server. The token will contain identification information for the entity (e.g., an alphanumeric string that is unique to each token) and a code that authenticates the entity with the server. The token can be used, for example, by the data source 702 as an alternative method to using a username and password for authentication.

To send data to the event collector 730, the data source 702 is supplied with a token and can then send HTTP 728 requests to the event collector 730. To send HTTP 728 requests, the data source 702 can be configured to use an HTTP client and/or to use logging libraries such as those supplied by Java, JavaScript, and .NET libraries. An HTTP client enables the data source 702 to send data to the event collector 730 by supplying the data, and a Uniform Resource Identifier (URI) for the event collector 730 to the HTTP client. The HTTP client then handles establishing a connection with the event collector 730, transmitting a request containing the data, closing the connection, and receiving an acknowledgment if the event collector 730 sends one. Logging libraries enable HTTP 728 requests to the event collector 730 to be generated directly by the data source. For example, an application can include or link a logging library, and through functionality provided by the logging library manage establishing a connection with the event collector 730, transmitting a request, and receiving an acknowledgement.

An HTTP 728 request to the event collector 730 can contain a token, a channel identifier, event metadata, and/or event data. The token authenticates the request with the event collector 730. The channel identifier, if available in the indexing system 720, enables the event collector 730 to segregate and keep separate data from different data sources. The event metadata can include one or more key-value pairs that describe the data source 702 or the event data included in the request. For example, the event metadata can include key-value pairs specifying a timestamp, a hostname, a source, a source type, or an index where the event data should be indexed. The event data can be a structured data object, such as a JavaScript Object Notation (JSON) object, or raw text. The structured data object can include both event data and event metadata. Additionally, one request can include event data for one or more events.

In some implementations, the event collector 730 extracts events from HTTP 728 requests and sends the events to the indexer 732. The event collector 730 can further be configured to send events to one or more indexers. Extracting the events can include associating any metadata in a request with the event or events included in the request. In these implementations, event generation by the indexer 732 (discussed further below) is bypassed, and the indexer 732 moves the events directly to indexing. In some implementations, the event collector 730 extracts event data from a request and outputs the event data to the indexer 732, and the indexer generates events from the event data. In some implementations, the event collector 730 sends an acknowledgement message to the data source 702 to indicate that the event collector 730 has received a particular request form the data source 702, and/or to indicate to the data source 702 that events in the request have been added to an index.

The indexer 732 ingests incoming data and transforms the data into searchable knowledge in the form of events. In the data intake and query system, an event is a single piece of data that represents activity of the component represented in FIG. 7 by the data source 702. An event can be, for example, a single record in a log file that records a single action performed by the component (e.g., a user login, a disk read, transmission of a network packet, etc.). An event includes one or more fields that together describe the action captured by the event, where a field is a key-value pair (also referred to as a name-value pair). In some cases, an event includes both the key and the value, and in some cases the event includes only the value and the key can be inferred or assumed.

Transformation of data into events can include event generation and event indexing. Event generation includes identifying each discrete piece of data that represents one event and associating each event with a timestamp and possibly other information (which may be referred to herein as metadata). Event indexing includes storing of each event in the data structure of an index. As an example, the indexer 732 can include a parsing module 734 and an indexing module 736 for generating and storing the events. The parsing module 734 and indexing module 736 can be modular and pipelined, such that one component can be operating on a first set of data while the second component is simultaneously operating on a second sent of data. Additionally, the indexer 732 may at any time have multiple instances of the parsing module 734 and indexing module 736, with each set of instances configured to simultaneously operate on data from the same data source or from different data sources. The parsing module 734 and indexing module 736 are illustrated in FIG. 7 to facilitate discussion, with the understanding that implementations with other components are possible to achieve the same functionality.

The parsing module 734 determines information about incoming event data, where the information can be used to identify events within the event data. For example, the parsing module 734 can associate a source type with the event data. A source type identifies the data source 702 and describes a possible data structure of event data produced by the data source 702. For example, the source type can indicate which fields to expect in events generated at the data source 702 and the keys for the values in the fields, and possibly other information such as sizes of fields, an order of the fields, a field separator, and so on. The source type of the data source 702 can be specified when the data source 702 is configured as a source of event data. Alternatively, the parsing module 734 can determine the source type from the event data, for example from an event field in the event data or using machine learning techniques applied to the event data.

Other information that the parsing module 734 can determine includes timestamps. In some cases, an event includes a timestamp as a field, and the timestamp indicates a point in time when the action represented by the event occurred or was recorded by the data source 702 as event data. In these cases, the parsing module 734 may be able to determine from the source type associated with the event data that the timestamps can be extracted from the events themselves. In some cases, an event does not include a timestamp and the parsing module 734 determines a timestamp for the event, for example from a name associated with the event data from the data source 702 (e.g., a file name when the event data is in the form of a file) or a time associated with the event data (e.g., a file modification time). As another example, when the parsing module 734 is not able to determine a timestamp from the event data, the parsing module 734 may use the time at which it is indexing the event data. As another example, the parsing module 734 can use a user-configured rule to determine the timestamps to associate with events.

The parsing module 734 can further determine event boundaries. In some cases, a single line (e.g., a sequence of characters ending with a line termination) in event data represents one event while in other cases, a single line represents multiple events. In yet other cases, one event may span multiple lines within the event data. The parsing module 734 may be able to determine event boundaries from the source type associated with the event data, for example from a data structure indicated by the source type. In some implementations, a user can configure rules the parsing module 734 can use to identify event boundaries.

The parsing module 734 can further extract data from events and possibly also perform transformations on the events. For example, the parsing module 734 can extract a set of fields (key-value pairs) for each event, such as a host or hostname, source or source name, and/or source type. The parsing module 734 may extract certain fields by default or based on a user configuration. Alternatively or additionally, the parsing module 734 may add fields to events, such as a source type or a user-configured field. As another example of a transformation, the parsing module 734 can anonymize fields in events to mask sensitive information, such as social security numbers or account numbers. Anonymizing fields can include changing or replacing values of specific fields. The parsing component 734 can further perform user-configured transformations.

The parsing module 734 outputs the results of processing incoming event data to the indexing module 736, which performs event segmentation and builds index data structures.

Event segmentation identifies searchable segments, which may alternatively be referred to as searchable terms or keywords, which can be used by the search system of the data intake and query system to search the event data. A searchable segment may be a part of a field in an event or an entire field. The indexer 732 can be configured to identify searchable segments that are parts of fields, searchable segments that are entire fields, or both. The parsing module 734 organizes the searchable segments into a lexicon or dictionary for the event data, with the lexicon including each searchable segment (e.g., the field "src=10.10.1.1") and a reference to the location of each occurrence of the searchable segment within the event data (e.g., the location within the event data of each occurrence of "src=10.10.1.1"). As discussed further below, the search system can use the lexicon, which is stored in an index file 746, to find event data that matches a search query. In some implementations, segmentation can alternatively be performed by the forwarder 726. Segmentation can also be disabled, in which case the indexer 732 will not build a lexicon for the event data. When segmentation is disabled, the search system searches the event data directly.

Building index data structures generates the index 738. The index 738 is a storage data structure on a storage device (e.g., a disk drive or other physical device for storing digital data). The storage device may be a component of the computing device on which the indexer 732 is operating (referred to herein as local storage) or may be a component of a different computing device (referred to herein as remote storage) that the indexer 738 has access to over a network. The indexer 732 can manage more than one index and can manage indexes of different types. For example, the indexer 732 can manage event indexes, which impose minimal structure on stored data and can accommodate any type of data. As another example, the indexer 732 can manage metrics indexes, which use a highly structured format to handle the higher volume and lower latency demands associated with metrics data.

The indexing module 736 organizes files in the index 738 in directories referred to as buckets. The files in a bucket 744 can include raw data files, index files, and possibly also other metadata files. As used herein, "raw data" means data as when the data was produced by the data source 702, without alteration to the format or content. As noted previously, the parsing component 734 may add fields to event data and/or perform transformations on fields in the event data. Event data that has been altered in this way is referred to herein as enriched data. A raw data file 748 can include enriched data, in addition to or instead of raw data. The raw data file 748 may be compressed to reduce disk usage. An index file 746, which may also be referred to herein as a "time-series index" or tsidx file, contains metadata that the indexer 732 can use to search a corresponding raw data file 748. As noted above, the metadata in the index file 746 includes a lexicon of the event data, which associates each unique keyword in the event data with a reference to the location of event data within the raw data file 748. The keyword data in the index file 746 may also be referred to as an inverted index. In various implementations, the data intake and query system can use index files for other purposes, such as to store data summarizations that can be used to accelerate searches.

A bucket 744 includes event data for a particular range of time. The indexing module 736 arranges buckets in the index 738 according to the age of the buckets, such that buckets for more recent ranges of time are stored in short-term storage 740 and buckets for less recent ranges of time are stored in long-term storage 742. Short-term storage 740 may be faster to access while long-term storage 742 may be slower to access. Buckets may be moves from short-term storage 740 to long-term storage 742 according to a configurable data retention policy, which can indicate at what point in time a bucket is old enough to be moved.

A bucket's location in short-term storage 740 or long-term storage 742 can also be indicated by the bucket's status. As an example, a bucket's status can be "hot," "warm," "cold," "frozen," or "thawed." In this example, hot bucket is one to which the indexer 732 is writing data and the bucket becomes a warm bucket when the index 732 stops writing data to it. In this example, both hot and warm buckets reside in short-term storage 740. Continuing this example, when a warm bucket is moved to long-term storage 742, the bucket becomes a cold bucket. A cold bucket can become a frozen bucket after a period of time, at which point the bucket may be deleted or archived. An archived bucket cannot be searched. When an archived bucket is retrieved for searching, the bucket becomes thawed and can then be searched.

The indexing system 720 can include more than one indexer, where a group of indexers is referred to as an index cluster. The indexers in an index cluster may also be referred to as peer nodes. In an index cluster, the indexers are configured to replicate each other's data by copying buckets from one indexer to another. The number of copies of a bucket can be configured (e.g., three copies of each buckets must exist within the cluster), and indexers to which buckets are copied may be selected to optimize distribution of data across the cluster.

A user can view the performance of the indexing system 720 through the monitoring console 716 provided by the user interface system 714. Using the monitoring console 716, the user can configure and monitor an index cluster, and see information such as disk usage by an index, volume usage by an indexer, index and volume size over time, data age, statistics for bucket types, and bucket settings, among other information.

Figure 8:
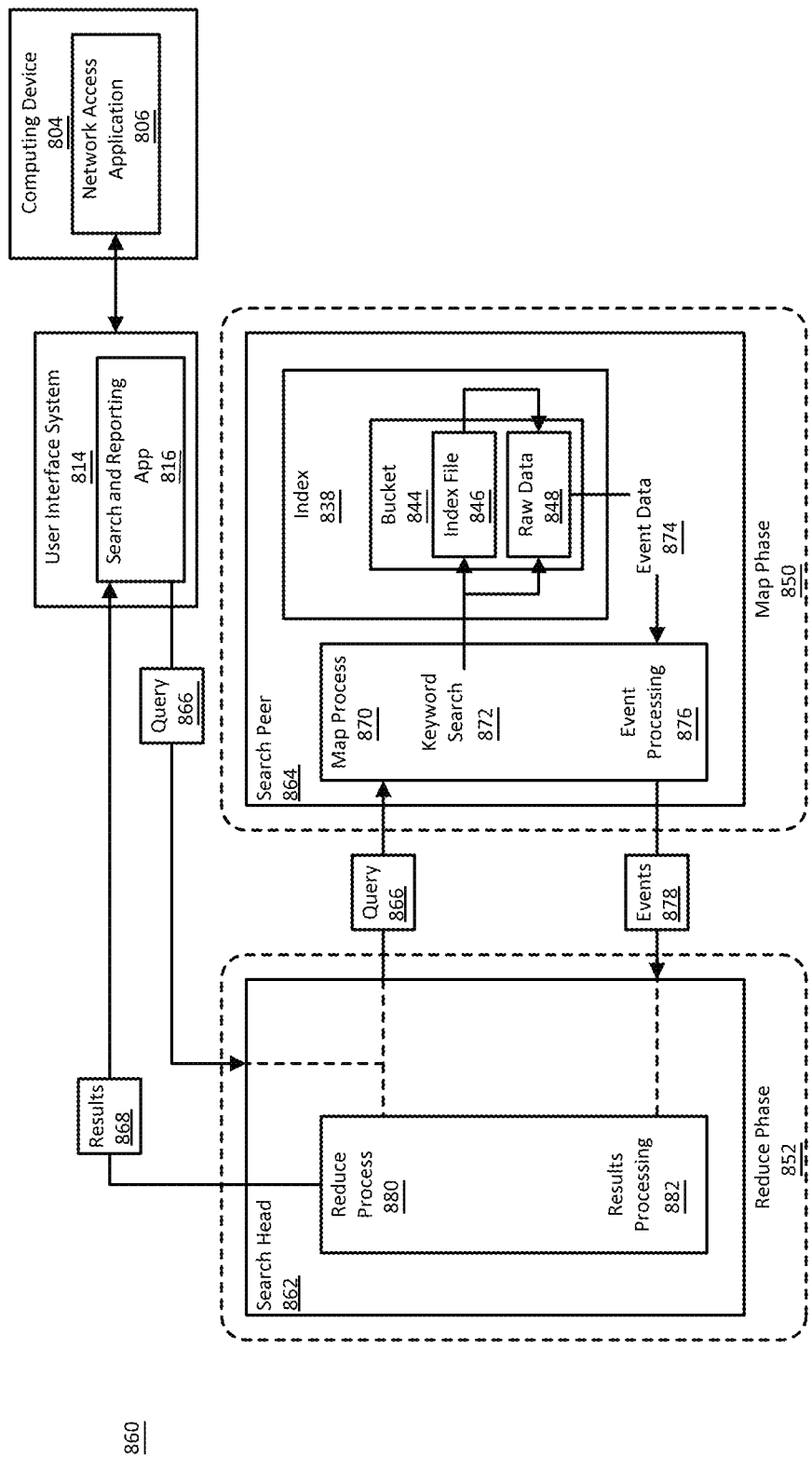
FIG. 8 is a block diagram illustrating in greater detail an example of the search system of a data intake and query system, such as the data intake and query system of FIG. 6 according to an implementation of the disclosure.

FIG. 8 is a block diagram illustrating in greater detail an example of the search system 860 of a data intake and query system, such as the data intake and query system 610 of FIG. 6. The search system 860 of FIG. 8 issues a query 866 to a search head 862, which sends the query 866 to a search peer 864. Using a map process 870, the search peer 864 searches the appropriate index 838 for events identified by the query 866 and sends events 878 so identified back to the search head 862. Using a reduce process 882, the search head 862 processes the events 878 and produces results 868 to respond to the query 866. The results 868 can provide useful insights about the data stored in the index 838. These insights can aid in the administration of information technology systems, in security analysis of information technology systems, and/or in analysis of the development environment provided by information technology systems.

The query 866 that initiates a search is produced by a search and reporting app 816 that is available through the user interface system 814 of the data intake and query system. Using a network access application 806 executing on a computing device 804, a user can input the query 866 into a search field provided by the search and reporting app 816. Alternatively or additionally, the search and reporting app 816 can include pre-configured queries or stored queries that can be activated by the user. In some cases, the search and reporting app 816 initiates the query 866 when the user enters the query 866. In these cases, the query 866 maybe referred to as an "ad-hoc" query. In some cases, the search and reporting app 816 initiates the query 866 based on a schedule. For example, the search and reporting app 816 can be configured to execute the query 866 once per hour, once per day, at a specific time, on a specific date, or at some other time that can be specified by a date, time, and/or frequency. These types of queries maybe referred to as scheduled queries.

The query 866 is specified using a search processing language. The search processing language includes commands or search terms that the search peer 864 will use to identify events to return in the search results 868. The search processing language can further include commands for filtering events, extracting more information from events, evaluating fields in events, aggregating events, calculating statistics over events, organizing the results, and/or generating charts, graphs, or other visualizations, among other examples. Some search commands may have functions and arguments associated with them, which can, for example, specify how the commands operate on results and which fields to act upon. The search processing language may further include constructs that enable the query 866 to include sequential commands, where a subsequent command may operate on the results of a prior command. As an example, sequential commands may be separated in the query 866 by a vertical line ("|" or "pipe") symbol.

In addition to one or more search commands, the query 866 includes a time indicator. The time indicator limits searching to events that have timestamps described by the indicator. For example, the time indicator can indicate a specific point in time (e.g., 10:00:00 am today), in which case only events that have the point in time for their timestamp will be searched. As another example, the time indicator can indicate a range of time (e.g., the last 24 hours), in which case only events whose timestamps fall within the range of time will be searched. The time indicator can alternatively indicate all of time, in which case all events will be searched.

Processing of the search query 866 occurs in two broad phases: a map phase 850 and a reduce phase 852. The map phase 850 takes place across one or more search peers. In the map phase 850, the search peers locate event data that matches the search terms in the search query 866 and sorts the event data into field-value pairs. When the map phase 850 is complete, the search peers send events that they have found to one or more search heads for the reduce phase 852. During the reduce phase 852, the search heads process the events through commands in the search query 866 and aggregate the events to produce the final search results 868.

A search head, such as the search head 862 illustrated in FIG. 8, is a component of the search system 860 that manages searches. The search head 862, which may also be referred to herein as a search management component, can be implemented using program code that can be executed on a computing device. The program code for the search head 862 can be stored on a non-transitory computer-readable medium and from this medium can be loaded or copied to the memory of a computing device. One or more hardware processors of the computing device can read the program code from the memory and execute the program code in order to implement the operations of the search head 862.

Upon receiving the search query 866, the search head 862 directs the query 866 to one or more search peers, such as the search peer 864 illustrated in FIG. 8. "Search peer" is an alternate name for "indexer" and a search peer may be largely similar to the indexer described previously. The search peer 864 may be referred to as a "peer node" when the search peer 864 is part of an indexer cluster. The search peer 864, which may also be referred to as a search execution component, can be implemented using program code that can be executed on a computing device. In some implementations, one set of program code implements both the search head 862 and the search peer 864 such that the search head 862 and the search peer 864 form one component. In some implementations, the search head 862 is an independent piece of code that performs searching and no indexing functionality. In these implementations, the search head 862 may be referred to as a dedicated search head.

The search head 862 may consider multiple criteria when determining whether to send the query 866 to the particular search peer 864. For example, the search system 860 may be configured to include multiple search peers that each have duplicative copies of at least some of the event data and are implanted using different hardware resources q. In this example, the sending the search query 866 to more than one search peer allows the search system 860 to distribute the search workload across different hardware resources. As another example, search system 860 may include different search peers for different purposes (e.g., one has an index storing a first type of data or from a first data source while a second has an index storing a second type of data or from a second data source). In this example, the search query 866 may specify which indexes to search, and the search head 862 will send the query 866 to the search peers that have those indexes.

To identify events 878 to send back to the search head 862, the search peer 864 performs a map process 870 to obtain event data 874 from the index 838 that is maintained by the search peer 864. During a first phase of the map process 870, the search peer 864 identifies buckets that have events that are described by the time indicator in the search query 866. As noted above, a bucket contains events whose timestamps fall within a particular range of time. For each bucket 844 whose events can be described by the time indicator, during a second phase of the map process 870, the search peer 864 performs a keyword search 874 using search terms specified in the search query 866. The search terms can be one or more of keywords, phrases, fields, Boolean expressions, and/or comparison expressions that in combination describe events being searched for. When segmentation is enabled at index time, the search peer 864 performs the keyword search 872 on the bucket's index file 846. As noted previously, the index file 846 includes a lexicon of the searchable terms in the events stored in the bucket's raw data 848 file. The keyword search 872 searches the lexicon for searchable terms that correspond to one or more of the search terms in the query 866. As also noted above, the lexicon incudes, for each searchable term, a reference to each location in the raw data 848 file where the searchable term can be found. Thus, when the keyword search identifies a searchable term in the index file 846 that matches a search term in the query 866, the search peer 864 can use the location references to extract from the raw data 848 file the event data 874 for each event that include the searchable term.

In cases where segmentation was disabled at index time, the search peer 864 performs the keyword search 872 directly on the raw data 848 file. To search the raw data 848, the search peer 864 may identify searchable segments in events in a similar manner as when the data was indexed. Thus, depending on how the search peer 864 is configured, the search peer 864 may look at event fields and/or parts of event fields to determine whether an event matches the query 866. Any matching events can be added to the event data 874 read from the raw data 848 file. The search peer 864 can further be configured to enable segmentation at search time, so that searching of the index 838 causes the search peer 864 to build a lexicon in the index file 846.

The event data 874 obtained from the raw data 848 file includes the full text of each event found by the keyword search 872. During a third phase of the map process 870, the search peer 864 performs event processing 876 on the event data 874, with the steps performed being determined by the configuration of the search peer 864 and/or commands in the search query 866. For example, the search peer 864 can be configured to perform field discovery and field extraction. Field discovery is a process by which the search peer 864 identifies and extracts key-value pairs from the events in the event data 874. The search peer 864 can, for example, be configured to automatically extract the first 100 fields (or another number of fields) in the event data 874 that can be identified as key-value pairs. As another example, the search peer 864 can extract any fields explicitly mentioned in the search query 866. The search peer 864 can, alternatively or additionally, be configured with particular field extractions to perform.

Other examples of steps that can be performed during event processing 876 include: field aliasing (assigning an alternate name to a field); addition of fields from lookups (adding fields from an external source to events based on existing field values in the events); associating event types with events; source type renaming (changing the name of the source type associated with particular events); and tagging (adding one or more strings of text, or a "tags" to particular events), among other examples.

The search peer 864 sends processed events 878 to the search head 862, which performs a reduce process 880. The reduce process 880 potentially receives events from multiple search peers and performs various results processing 882 steps on the received events. The results processing 882 steps can include, for example, aggregating the events received from different search peers into a single set of events, deduplicating and aggregating fields discovered by different search peers, counting the number of events found, and sorting the events by timestamp (e.g., newest first or oldest first), among other examples. Results processing 882 can further include applying commands from the search query 866 to the events. The query 866 can include, for example, commands for evaluating and/or manipulating fields (e.g., to generate new fields from existing fields or parse fields that have more than one value). As another example, the query 866 can include commands for calculating statistics over the events, such as counts of the occurrences of fields, or sums, averages, ranges, and so on, of field values. As another example, the query 866 can include commands for generating statistical values for purposes of generating charts of graphs of the events.

The reduce process 880 outputs the events found by the search query 866, as well as information about the events.

The search head 862 transmits the events and the information about the events as search results 868, which are received by the search and reporting app 816. The search and reporting app 816 can generate visual interfaces for viewing the search results 868. The search and reporting app 816 can, for example, output visual interfaces for the network access application 806 running on a computing device 804 to generate.

The visual interfaces can include various visualizations of the search results 868, such as tables, line or area charts, Choropleth maps, or single values. The search and reporting app 816 can organize the visualizations into a dashboard, where the dashboard includes a panel for each visualization. A dashboard can thus include, for example, a panel listing the raw event data for the events in the search results 868, a panel listing fields extracted at index time and/or found through field discovery along with statistics for those fields, and/or a timeline chart indicating how many events occurred at specific points in time (as indicated by the timestamps associated with each event). In various implementations, the search and reporting app 816 can provide one or more default dashboards. Alternatively or additionally, the search and reporting app 816 can include functionality that enables a user to configure custom dashboards.

The search and reporting app 816 can also enable further investigation into the events in the search results 816. The process of further investigation may be referred to as drill-down. For example, a visualization in a dashboard can include interactive elements, which, when selected, provide options for finding out more about the data being displayed by the interactive elements. To find out more, an interactive element can, for example, generate a new search that includes some of the data being displayed by the interactive element, and thus may be more focused than the initial search query 866. As another example, an interactive element can launch a different dashboard whose panels include more detailed information about the data that is displayed by the interactive element. Other examples of actions that can be performed by interactive elements in a dashboard include opening a link, playing an audio or video file, or launching another application, among other examples.

Figure 9:
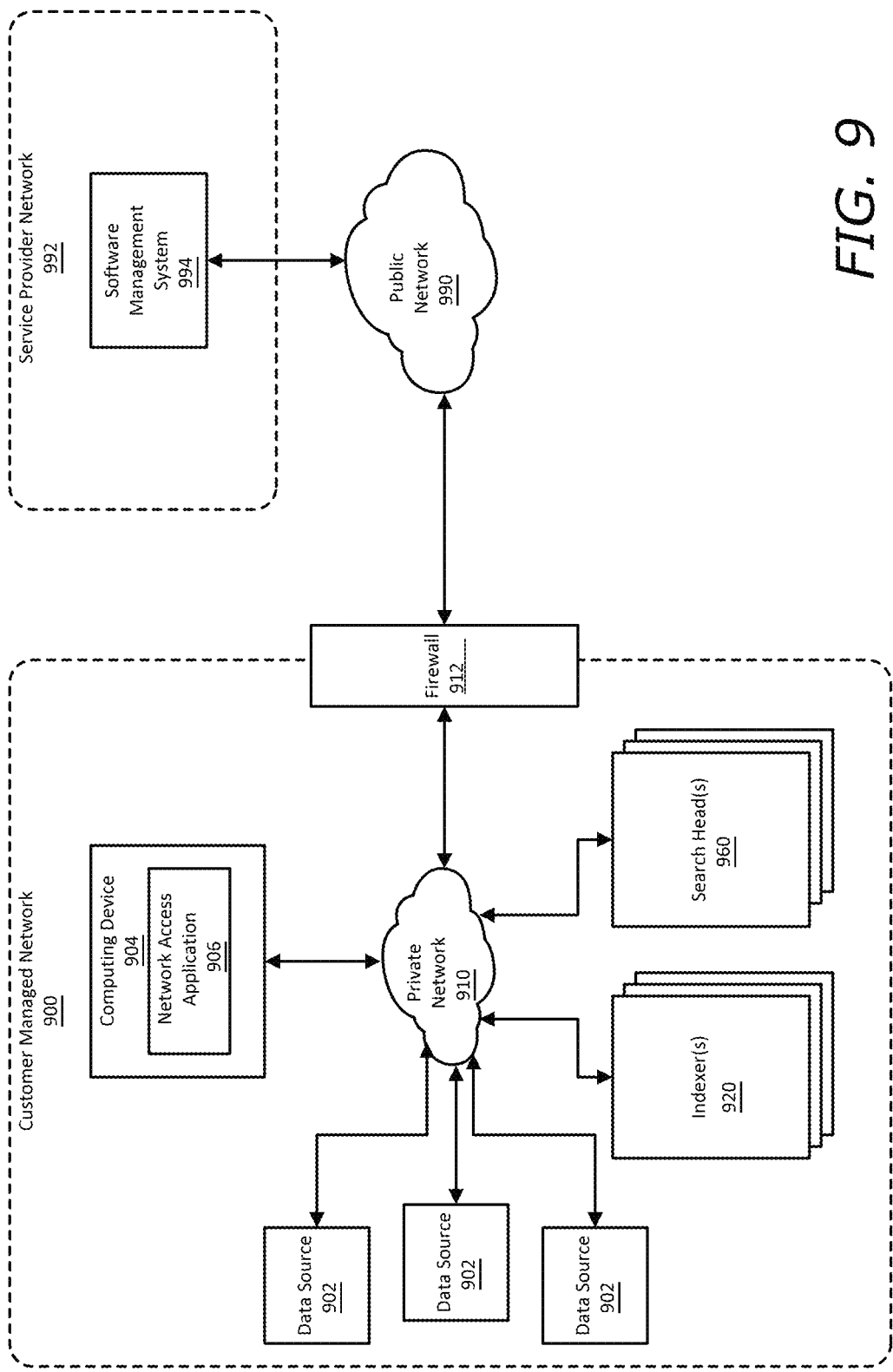
FIG. 9 illustrates an example of a self-managed network 900 that includes a data intake and query system according to an implementation of the disclosure.

FIG. 9 illustrates an example of a self-managed network 900 that includes a data intake and query system. "Self-managed" in this instance means that the entity that is operating the self-managed network 900 configures, administers, maintains, and/or operates the data intake and query system using its own compute resources and people. Further, the self-managed network 900 of this example is part of the entity's on-premise network and comprises a set of compute, memory, and networking resources that are located, for example, within the confines of a entity's data center. These resources can include software and hardware resources. The entity can, for example, be a company or enterprise, a school, government entity, or other entity. Since the self-managed network 900 is located within the customer's on-prem environment, such as in the entity's data center, the operation and management of the self-managed network 900, including of the resources in the self-managed network 900, is under the control of the entity. For example, administrative personnel of the entity have complete access to and control over the configuration, management, and security of the self-managed network 900 and its resources.

The self-managed network 900 can execute one or more instances of the data intake and query system. An instance of the data intake and query system may be executed by one or more computing devices that are part of the self-managed network 900. A data intake and query system instance can comprise an indexing system and a search system, where the indexing system includes one or more indexers 920 and the search system includes one or more search heads 960.

As depicted in FIG. 9, the self-managed network 900 can include one or more data sources 902. Data received from these data sources may be processed by an instance of the data intake and query system within self-managed network 900. The data sources 902 and the data intake and query system instance can be communicatively coupled to each other via a private network 910.

Users associated with the entity can interact with and avail themselves of the functions performed by a data intake and query system instance using computing devices. As depicted in FIG. 9, a computing device 904 can execute a network access application 906 (e.g., a web browser), that can communicate with the data intake and query system instance and with data sources 902 via the private network 910. Using the computing device 904, a user can perform various operations with respect to the data intake and query system, such as management and administration of the data intake and query system, generation of knowledge objects, and other functions. Results generated from processing performed by the data intake and query system instance may be communicated to the computing device 904 and output to the user via an output system (e.g., a screen) of the computing device 904.

The self-managed network 900 can also be connected to other networks that are outside the entity's on-premise environment/network, such as networks outside the entity's data center. Connectivity to these other external networks is controlled and regulated through one or more layers of security provided by the self-managed network 900. One or more of these security layers can be implemented using firewalls 912. The firewalls 912 form a layer of security around the self-managed network 900 and regulate the transmission of traffic from the self-managed network 900 to the other networks and from these other networks to the self-managed network 900.

Networks external to the self-managed network can include various types of networks including public networks 990, other private networks, and/or cloud networks provided by one or more cloud service providers. An example of a public network 990 is the Internet. In the example depicted in FIG. 9, the self-managed network 900 is connected to a service provider network 992 provided by a cloud service provider via the public network 990.

In some implementations, resources provided by a cloud service provider may be used to facilitate the configuration and management of resources within the self-managed network 900. For example, configuration and management of a data intake and query system instance in the self-managed network 900 may be facilitated by a software management system 994 operating in the service provider network 992. There are various ways in which the software management system 994 can facilitate the configuration and management of a data intake and query system instance within the self-managed network 900. As one example, the software management system 994 may facilitate the download of software including software updates for the data intake and query system. In this example, the software management system 994 may store information indicative of the versions of the various data intake and query system instances present in the self-managed network 900. When a software patch or upgrade is available for an instance, the software management system 994 may inform the self-managed network 900 of the patch or upgrade. This can be done via messages communicated from the software management system 994 to the self-managed network 900.

The software management system 994 may also provide simplified ways for the patches and/or upgrades to be downloaded and applied to the self-managed network 900. For example, a message communicated from the software management system 994 to the self-managed network 900 regarding a software upgrade may include a Uniform Resource Identifier (URI) that can be used by a system administrator of the self-managed network 900 to download the upgrade to the self-managed network 900. In this manner, management resources provided by a cloud service provider using the service provider network 992 and which are located outside the self-managed network 900 can be used to facilitate the configuration and management of one or more resources within the entity's on-prem environment. In some implementations, the download of the upgrades and patches may be automated, whereby the software management system 994 is authorized to, upon determining that a patch is applicable to a data intake and query system instance inside the self-managed network 900, automatically communicate the upgrade or patch to self-managed network 900 and cause it to be installed within self-managed network 900.

Various examples and possible implementations have been described above, which recite certain features and/or functions. Although these examples and implementations have been described in language specific to structural features and/or functions, it is understood that the subject matter defined in the appended claims is not necessarily limited to the specific features or functions described above. Rather, the specific features and functions described above are disclosed as examples of implementing the claims, and other equivalent features and acts are intended to be within the scope of the claims. Further, any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Processing of the various components of systems illustrated herein can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Examples have been described with reference to flow chart illustrations and/or block diagrams of methods, apparatus (systems), and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

What is claimed is:

1. A computer-implemented method, comprising:
   receiving a current Domain Name System (DNS) request from a first source to access a first domain;
   tokenizing the current DNS request into a numerical representation including creating a first vector where one element of the first vector corresponds to one of a plurality of characters included in a listing of printable text characters, each element of the first vector containing a value representing a number of occurrences of one particular character in the current DNS request;
   determining values of a set of additional features corresponding to the current DNS request, wherein a second vector is formed representing the values of the set of additional features;
   concatenating the first vector with a second vector, wherein the second vector corresponds to at least one of the additional features of the current DNS request and to at least one of the additional features calculated over a number of DNS requests by the first source to access the first domain, resulting in an input vector representing the current DNS request;
   deploying a neural network that is configured to receive the input vector and generate a probability score indicating a likelihood that the current DNS request is associated with DNS exfiltration;
   receiving, from the neural network, the probability score for the current DNS request; and
   generating a graphical user interface displaying an indication of the probability score for the current DNS request.

2. The computer-implemented method of claim 1, wherein determining the values of the set of additional features includes:
   determining a value for one or more additional features of the current DNS request; and
   determining a value for one or more additional features calculated over the number of DNS requests by the first source to access the first domain.

3. The computer-implemented method of claim 2, wherein the number of DNS requests by the first source to access the first domain is a predetermined number N, which includes the current DNS request and N−1 previous DNS requests by the first source to access the first domain.

4. The computer-implemented method of claim 1, wherein the second vector comprises four elements corresponding to four features, wherein two of the four elements correspond to features of the current DNS request and two of the four elements corresponding to features calculated over the number of DNS requests.

5. The computer-implemented method of claim 4, wherein the four features include:
   length of the current DNS request, entropy of the current DNS request, average value of entropy over the number of DNS requests, and average length of DNS requests over the number of DNS requests.

6. The computer-implemented method of claim 1, wherein the neural network comprises:
   an input layer;
   a first linear layer connected to the input layer, the first linear layer having a rectified linear unit (ReLU) activation function;
   a second linear layer connected to the first linear layer, the second linear layer having a second ReLU activation function; and
   the output layer connected to the second linear layer, the output layer having a Sigmoid activation function, which generates the probability score.

7. The computer-implemented method of claim 1, further comprising:
   executing a search query statement that incorporates information of the current DNS request in response to the probability score generated by the neural network; and
   displaying on the graphical user interface or on a second graphical user interface, a graphical image illustrating a result of the search query statement.

8. A computing device, comprising:
   a processor; and
   a non-transitory computer-readable medium having stored thereon instructions that, when executed by the processor, cause the processor to perform operations including:
     receiving a current Domain Name System (DNS) request from a first source to access a first domain;
     tokenizing the current DNS request into a numerical representation including creating a first vector where one element of the first vector corresponds to one of a plurality of characters included in a listing of printable text characters, each element of the first vector containing a value representing a number of occurrences of one particular character in the current DNS request;
     determining values of a set of additional features corresponding to the current DNS request, wherein a second vector is formed representing the values of the set of additional features;
     concatenating the first vector with a second vector, wherein the second vector corresponds to at least one of the additional features of the current DNS request and to at least one of the additional features calculated over a number of DNS requests by the first source to access the first domain, resulting in an input vector representing the current DNS request;
     deploying a neural network that is configured to receive the input vector and generate a probability score indicating a likelihood that the current DNS request is associated with DNS exfiltration;
     receiving, from the neural network, the probability score for the current DNS request; and
     generating a graphical user interface displaying an indication of the probability score for the current DNS request.

9. The computing device of claim 8, wherein determining the values of the set of additional features includes:
   determining a value for one or more additional features of the current DNS request; and
   determining a value for one or more additional features calculated over the number of DNS requests by the first source to access the first domain.

10. The computing device of claim 9, wherein the number of DNS requests by the first source to access the first domain is a predetermined number N, which includes the current DNS request and N−1 previous DNS requests by the first source to access the first domain.

11. The computing device of claim 8, wherein the second vector comprises four elements corresponding to four features, wherein two of the four elements correspond to features of the current DNS request and two of the four elements corresponding to features calculated over the number of DNS requests.

12. The computing device of claim 11, wherein the four features include: length of the current DNS request, entropy of the current DNS request, average value of entropy over the number of DNS requests, and average length of DNS requests over the number of DNS requests.

13. The computing device of claim 8, wherein the neural network comprises:
   an input layer;
   a first linear layer connected to the input layer, the first linear layer having a rectified linear unit (ReLU) activation function;
   a second linear layer connected to the first linear layer, the second linear layer having a second ReLU activation function; and
   the output layer connected to the second linear layer, the output layer having a Sigmoid activation function, which generates the probability score.

14. The computing device of claim 8, further comprising:
   executing a search query statement that incorporates information of the current DNS request in response to the probability score generated by the neural network; and
   displaying on the graphical user interface or on a second graphical user interface, a graphical image illustrating a result of the search query statement.

15. A non-transitory computer-readable medium having stored thereon instructions that, when executed by one or more processors, cause the one or more processor to perform operations including:
   receiving a current Domain Name System (DNS) request from a first source to access a first domain;
   tokenizing the current DNS request into a numerical representation including creating a first vector where one element of the first vector corresponds to one of a plurality of characters included in a listing of printable text characters, each element of the first vector containing a value representing a number of occurrences of one particular character in the current DNS request;

determining values of a set of additional features corresponding to the current DNS request, wherein a second vector is formed representing the values of the set of additional features;

concatenating the first vector with a second vector, wherein the second vector corresponds to at least one of the additional features of the current DNS request and to at least one of the additional features calculated over a number of DNS requests by the first source to access the first domain, resulting in an input vector representing the current DNS request;

deploying a neural network that is configured to receive the input vector and generate a probability score indicating a likelihood that the current DNS request is associated with DNS exfiltration;

receiving, from the neural network, the probability score for the current DNS request; and generating a graphical user interface displaying an indication of the probability score for the current DNS request.

16. The non-transitory computer-readable medium of claim 15, wherein determining the values of the set of additional features includes:

determining a value for one or more additional features of the current DNS request; and determining a value for one or more additional features calculated over the number of DNS requests by the first source to access the first domain.

17. The non-transitory computer-readable medium of claim 16, wherein the number of DNS requests by the first source to access the first domain is a predetermined number N, which includes the current DNS request and N−1 previous DNS requests by the first source to access the first domain.

18. The non-transitory computer-readable medium of claim 15, wherein the second vector comprises four elements corresponding to four features, wherein two of the four elements correspond to features of the current DNS request and two of the four elements corresponding to features calculated over the number of DNS requests, and wherein the four features include: length of the current DNS request, entropy of the current DNS request, average value of entropy over the number of DNS requests, and average length of DNS requests over the number of DNS requests.

19. The non-transitory computer-readable medium of claim 15, the operations further include:

executing a search query statement that incorporates information of the current DNS request in response to the probability score generated by the neural network; and displaying on the graphical user interface or on a second graphical user interface, a graphical image illustrating a result of the search query statement.

20. The non-transitory computer-readable medium of claim 15, wherein the neural network comprises:

an input layer;

a first linear layer connected to the input layer, the first linear layer having a rectified linear unit (ReLU) activation function;

a second linear layer connected to the first linear layer, the second linear layer having a second ReLU activation function; and the output layer connected to the second linear layer, the output layer having a Sigmoid activation function, which generates the probability score.

* * * * *